United States Patent
Sasaki et al.

[11] Patent Number: 5,960,141
[45] Date of Patent: Sep. 28, 1999

[54] OPTICAL TRANSMISSION TERMINAL DEVICE

[75] Inventors: Seimi Sasaki; Kazuhiro Tanaka; Youske Yamazaki; Goji Nakagawa; Kazunori Miura, all of Kawasaki, Japan

[73] Assignee: Fujitsu Limited, Kawasaki, Japan

[21] Appl. No.: 09/042,002

[22] Filed: Mar. 13, 1998

[30] Foreign Application Priority Data

Oct. 17, 1997 [JP] Japan ................................ 9-285099

[51] Int. Cl.⁶ .................. G02B 6/00; G02B 6/36
[52] U.S. Cl. ............................................ 385/88
[58] Field of Search .................. 385/49, 14, 83, 385/88, 89, 91, 92, 46, 42, 47, 122, 147; 359/173, 161, 179, 341

[56] References Cited

U.S. PATENT DOCUMENTS

| | | | |
|---|---|---|---|
| 4,690,492 | 9/1987 | Beard | 385/89 |
| 5,268,980 | 12/1993 | Yuuki | 385/46 |
| 5,471,333 | 11/1995 | Taga et al. | 359/173 |
| 5,675,684 | 10/1997 | Hirataka et al. | 385/88 |
| 5,778,120 | 7/1998 | Asakura et al. | 385/49 |
| 5,859,943 | 1/1999 | Asakura et al. | 385/49 |

FOREIGN PATENT DOCUMENTS 2-187712  7/1990  Japan .

*Primary Examiner*—Akm E. Ullah
*Attorney, Agent, or Firm*—Staas & Halsey

[57] ABSTRACT

An optical transmission terminal device including a printed wiring board and an optical module mounted on the printed wiring board. The optical module includes an optical component mounting substrate, a photoelectric converter mounted on the substrate, a first optical fiber having one end optically coupled to the photoelectric converter, and a ferrule mounted on the substrate so as to partially project from the substrate. The other end portion of the first optical fiber is inserted and fixed in the ferrule. A wiring pattern formed on the printed wiring board and a feed electrode formed on the substrate are connected together by wire bonding. An optically coupled portion between the photoelectric converter and the first optical fiber and a connected portion between the wiring pattern and the feed electrode are commonly covered with a transparent resin. The optical transmission terminal device further includes an optical fiber connector housing mounted on the optical module for allowing connection of the first optical fiber to a second optical fiber.

22 Claims, 33 Drawing Sheets

F I G. 30A
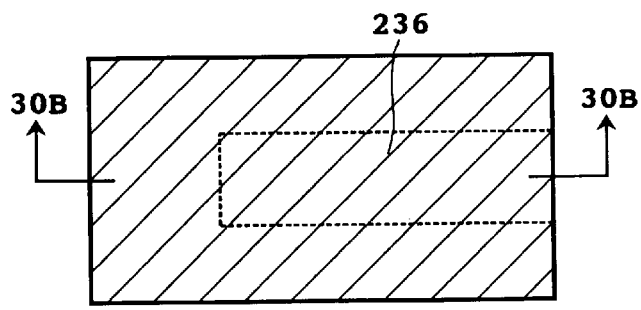
F I G. 30B
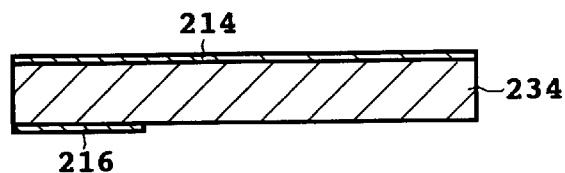
F I G. 30C
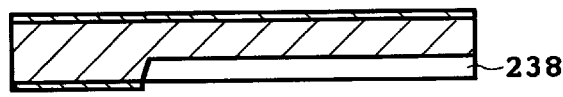
F I G. 30D
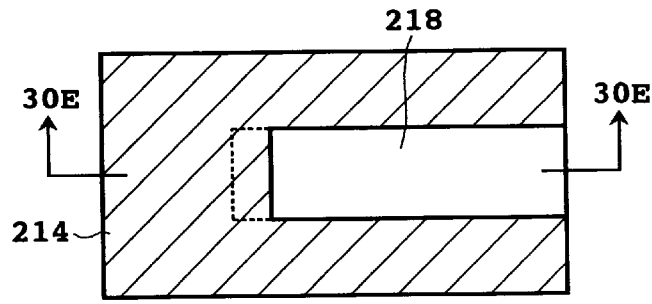
F I G. 30E
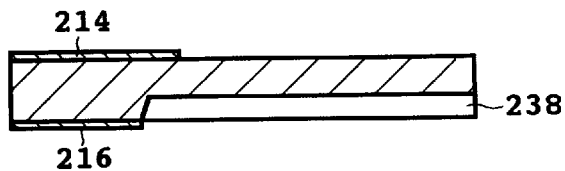

F I G. 30F 
F I G. 30G 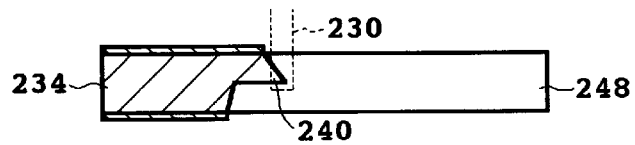
F I G. 30H 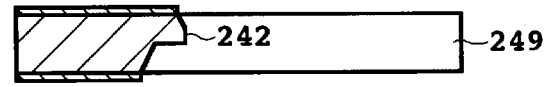
F I G. 30I 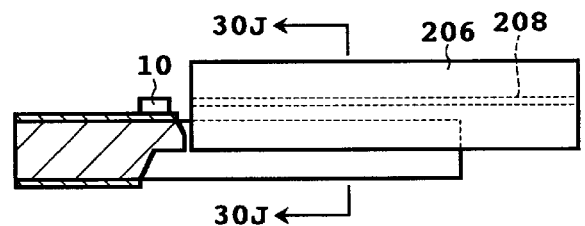
F I G. 30J 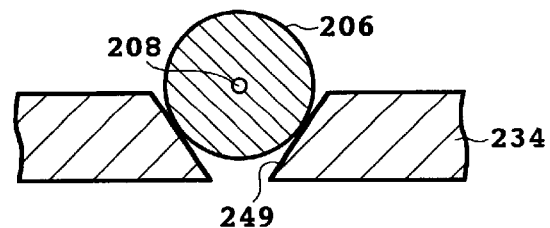

OPTICAL TRANSMISSION TERMINAL DEVICE

BACKGROUND OF THE INVENTION

1. Field of the Invention

The present invention relates generally to an optical transmission terminal device used in an optical communication field, and more particularly to a package structure of an optical module for performing conversion from an optical signal to an electrical signal or conversion from an electrical signal to an optical signal.

2. Description of the Related Art

In a recent information communication field, high-speed large-capacity computing and high-speed data transmission are required in response to advance of information. To meet this requirement, optical transmission is indispensable and it is now being prepared for an expansion and proliferation of optical communication networks.

As a device used at various sites in an optical transmission system, there exists an optical transmission terminal device including an optical circuit and an electrical circuit in combination to perform conversion from an optical signal to an electrical signal or conversion from an electrical signal to an optical signal. At present, the scale of production of the optical transmission terminal device per manufacture is about a hundred thousand a year. However, it is said that the production scale required in the future will become a million or more a year in response to a proliferation of optical communication networks and that the manufacturing cost will have to be reduced to ¹/₁₀ or less of the present level. To this end, it is strongly desired to develop a form of the optical transmission terminal device which can realize mass production and low cost by minimizing the number of parts and simplifying the fabrication process and can also ensure high reliability and long life.

A component mounted on a printed wiring board incorporated in communication equipment is generally classified into a surface mount type and a through-hole mount type. A typical example of the surface mount type component is an LSI, which has a form called a flat package. This component is soldered by a reflow soldering process. This process is carried out by printing a solder paste on a printed wiring board, attaching the surface mount type component to the printed solder paste, and soldering the component to the printed wiring board in a conveyor furnace giving a solder surface temperature of 220° C. or higher.

On the other hand, a typical example of the through-hole mount type component is a large-capacity capacitor or an LSI having a large number of terminals (200 or more terminals). The LSI having a large number of terminals has a terminal form called a PGA (Pin Grid Array). Such a through-hole mount type component is soldered by a flow soldering process. This process is carried out by inserting the terminals of the through-hole mount type component into through holes of a printed wiring board, dipping the printed wiring board into a solder bath at about 260° C. from the side opposite to the component mounted side, and soldering the component to the printed wiring board in the solder bath.

In the case of mounting an optical module on a printed wiring board by soldering similar to that used in mounting the surface mount type component or the through-hole mount type component, a so-called pigtail type optical module with an optical fiber cord is unsuitable. Usually, the optical fiber cord has a nylon coating, which has a low heat-resisting temperature of about 80° C. Accordingly, the optical fiber cord is melted in the soldering process. Further, the optical fiber cord itself is inconvenient for storage and handling at a manufacturing site, causing a remarkable reduction in mounting efficiency to a printed wiring board. Accordingly, to allow the use of soldering for an optical module and reduce a manufacturing cost, the application of a so-called receptacle type optical module is essential.

A conventional receptacle type optical module allowing the use of soldering is described in IEICE, General Meeting, papers C-184, 1996 (Reference 1). The receptacle type optical module described in Reference 1 has a structure such that a photoelectric converter and an optical fiber with a ferrule are held on a silicon substrate, and this assembly is packaged by a ceramic.

In this optical module structure, a cover is mounted on the ceramic package and fixed by a thermoplastic resin adhesive to achieve hermetic sealing of an optically coupled portion, so as to prevent corrosion of the photoelectric converter due to moisture, oxygen, etc. and condensation at the optically coupled portion. Further, a block as an optical fiber holding member is mounted on the ceramic package to allow connection and disconnection of the ceramic package to a second optical fiber. Flat leads extending from the ceramic package are soldered to a printed wiring board by reflow soldering, thereby achieving mounting of the optical module on the printed wiring board.

Another conventional receptacle type optical module is described in IEICE, General Meeting, papers C-207, 1996 (Reference 2). The receptacle type optical module described in Reference 2 has a structure such that a photoelectric converter and an optical fiber with a ferrule are held on a silicon substrate and covered with a silicon cap for the purpose of hermetic sealing an optically coupled portion, and this assembly is fully molded with an epoxy resin. A commercially available MU type connector housing is mounted on an optical fiber connecting portion of the optical module to allow connection and disconnection of the optical module to a second optical fiber. Further, leads extending from the molded package are soldered to a printed wiring board by flow soldering, thereby achieving mounting of the optical module to the printed wiring board.

The most significant challenge in the optical transmission terminal device is to achieve low cost. Much of the cost is related with an optical module having a photoelectric conversion function. It is therefore essential both to ensure high performance, high reliability, and long life of the optical module and to simplify and make efficient the fabrication process of the optical module and the mounting method for the optical module to a printed wiring board. However, the above-mentioned prior art has the following problems.

In the optical module described in Reference 1, the package and the cover cooperate with each other to form a structure for hermetically sealing the optically coupled portion. However, a side wall of the package is formed with a slit for taking the optical fiber out of the package, so that a gap in the slit must be closed to realize the hermetic sealing. Accordingly, a step of filling the gap with an adhesive is required, and this step is unavoidably manually performed, causing a reduction in fabrication efficiency.

Further, the optical fiber with the ferrule is constructed by using a bare fiber and a ferrule as separate components, partially inserting the bare fiber into the ferrule, and fixing them together by an adhesive. Accordingly, a stress is readily applied to a root portion of the optical fiber (i.e., a boundary portion between the bare fiber and the ferrule), and the optical fiber possibly cannot ensure a load in connection or disconnection of an optical fiber connector to the optical module. Further, this optical module requires the package for hermetically sealing the optically coupled portion, and an expensive ceramic package is used as this package. Accordingly, there is a limit from the viewpoints of reduction in parts count and reduction in material cost.

On the other hand, the fabrication of the optical module described in Reference 2 requires the step of molding the optically coupled portion hermetically sealed by the silicon substrate and the silicon cap with an epoxy resin having a low coefficient of thermal expansion. In this molding step, a pressure as high as 80 kgf/cm$^2$ is applied to the optically coupled portion in injecting a molten resin into a mold. In the case that the optical module is a semiconductor laser module, a tolerable misalignment between the semiconductor laser and the optical fiber is usually very exact such as ±1 $\mu$m or less, and it is accordingly very difficult to maintain the position accuracy between the photoelectric converter and the optical fiber in the resin molding step involving application of the above-mentioned injection pressure. As a result, the optical modules manufactured exhibit large variations in optical coupling loss, which lead to a reduction in yield. Further, since the semiconductor laser is surrounded by the resin material having low heat conductivity, a deterioration in characteristics of the semiconductor laser module requiring heat dissipation is unavoidable.

Each of the optical modules described in References 1 and 2 has a form such that an optical fiber connector is plugged into the optical module toward its side surface in one direction. Further, the connection or disconnection of the optical fiber connector is carried out after soldering the optical module to the printed wiring board. Accordingly, when connecting or disconnecting the optical fiber connector, a stress is concentrated at a soldered portion between the optical module and the printed wiring board via the leads. As a result, there is a possibility of electrical contact failure caused by solder separation due to the stress or lead break due to metal fatigue, for example.

SUMMARY OF THE INVENTION

It is therefore an object of the present invention to provide an optical transmission terminal device having a package structure suitable for mass production and achieving low cost and high reliability.

In accordance with an aspect of the present invention, there is provided an optical transmission terminal device comprising a printed wiring board; an optical module mounted on said printed wiring board, said optical module having an optical component mounting substrate, a photoelectric converter mounted on said substrate, a first optical fiber having one end optically coupled to said photoelectric converter, a ferrule mounted on said substrate so as to partially project from said substrate, the other end portion of said first optical fiber being inserted and fixed in said ferrule, and feed electrodes formed on said substrate and connected to said photoelectric converter; means for connecting said printed wiring board and said feed electrodes; a transparent resin for commonly covering said connecting means and an optically coupled portion between said photoelectric converter and said first optical fiber; and an optical fiber connector housing mounted on said optical module so as to surround said ferrule, for allowing connection of said first optical fiber to a second optical fiber.

Preferably, the optical component mounting substrate has a groove for receiving the ferrule and a groove for receiving the first optical fiber. The optical module has a cover fixed to the optical component mounting substrate from the upper side thereof, for holding the ferrule and the first optical fiber.

In accordance with another aspect of the present invention, there is provided an optical transmission terminal device comprising a printed wiring board; an optical module mounted on said printed wiring board, said optical module having an optical component mounting substrate, a photoelectric converter mounted on said substrate, a first optical fiber having one end optically coupled to said photoelectric converter, a ferrule mounted on said substrate so as to partially project from said substrate, the other end portion of said first optical fiber being inserted and fixed in said ferrule, feed electrodes formed on said substrate and connected to said photoelectric converter, and a cover fixed to said substrate for hermetically sealing said photoelectric converter and said first optical fiber; means for connecting said printed wiring board and said feed electrodes; an optical fiber connector housing fixed to said printed wiring board so as to surround said optical module, for allowing connection of said first optical fiber to a second optical fiber, said optical fiber connector having an opening at a portion corresponding to said connecting means; and a resin for filling said opening so as to cover said connecting means.

In accordance with still another aspect of the present invention, there is provided an optical transmission terminal device comprising a casing having an end wall formed with an opening and having an open top; an optical module fixed in said casing, said optical module having an optical component mounting substrate, a photoelectric converter mounted on said substrate, a first optical fiber having one end optically coupled to said photoelectric converter, a ferrule mounted on said substrate so as to partially project from said opening of said casing, the other end portion of said first optical fiber being inserted and fixed in said ferrule, and feed electrodes formed on said substrate and connected to said photoelectric converter; a transparent resin for filling said casing; and an optical fiber connector housing mounted on said casing so as to close said opening, for allowing connection of said first optical fiber to a second optical fiber.

Preferably, the optical fiber connector housing comprises a body and a pair of connector holding members pivotably mounted to the body. By engaging these connector holding members with an optical fiber connector connected to the second optical fiber, the first optical fiber is optically coupled to the second optical fiber. Accordingly, it is possible to prevent the occurrence of stress concentration at a soldered portion between lead terminals of the optical module and the printed wiring board when connecting or disconnecting the optical fiber connector.

In accordance with a further aspect of the present invention, there is provided an optical transmission terminal device comprising a printed wiring board; an optical module mounted on said printed wiring board, said optical module having an optical component mounting substrate having an optical waveguide, a photoelectric converter mounted on said substrate so as to be optically coupled to one end of said optical waveguide, a first optical fiber having one end optically coupled to the other end of said optical waveguide, a ferrule mounted on said substrate so as to partially project from said substrate, the other end portion of said first optical fiber being inserted and fixed in said ferrule, and feed electrodes formed on said substrate and connected to said photoelectric converter; means for connecting said printed wiring board and said feed electrodes; a transparent resin for covering an optically coupled portion between said photoelectric converter and said optical waveguide and an optically coupled portion between said optical waveguide and said first optical fiber; and an optical fiber connector housing mounted on said optical module so as to surround said ferrule, for allowing connection of said first optical fiber to a second optical fiber.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 30A to 30J are views showing still another forming process for the ferrule holding slot;

DETAILED DESCRIPTION OF THE PREFERRED EMBODIMENTS

Figure 1:
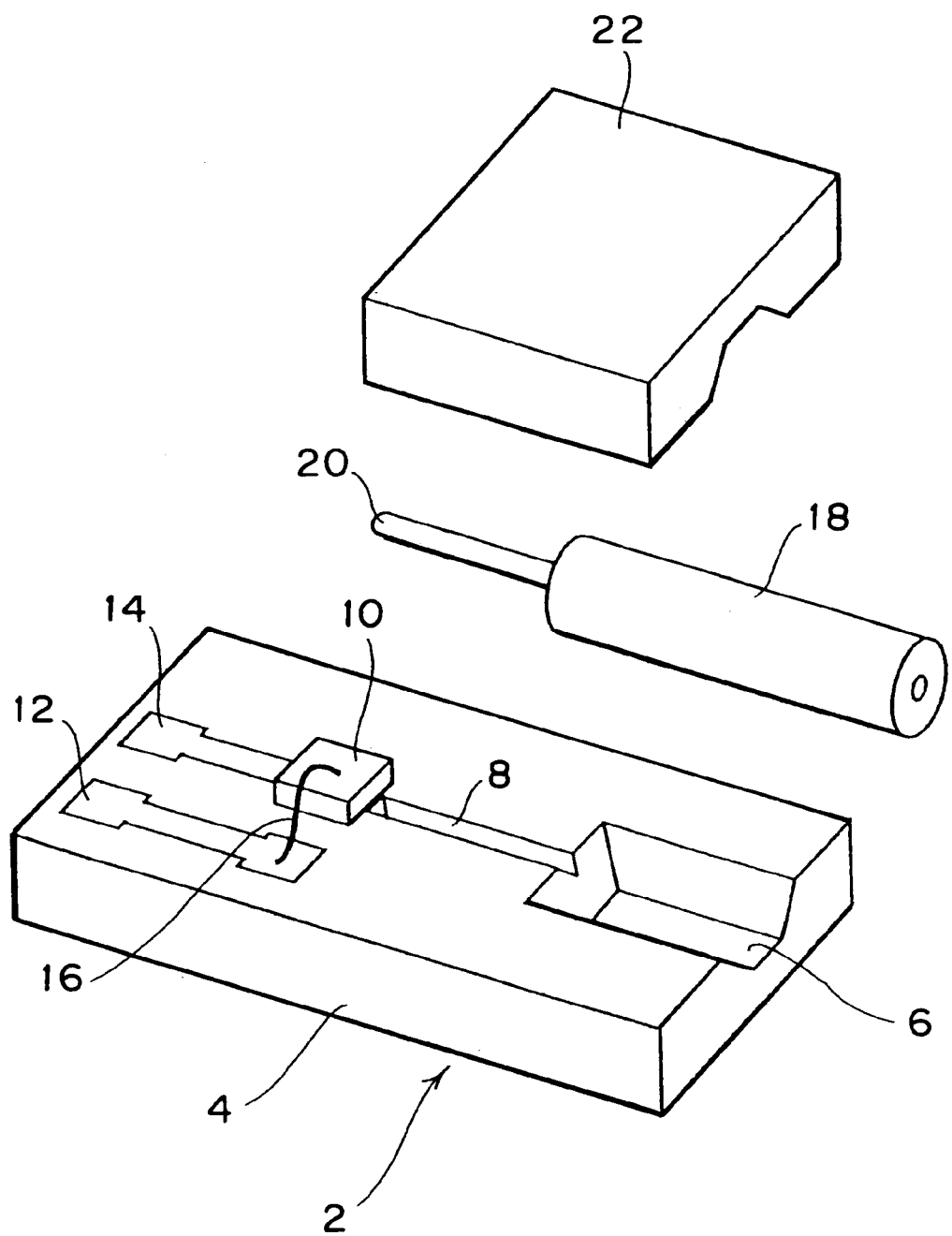
FIG. 1 is an exploded perspective view of an optical module applied to a first preferred embodiment of the optical transmission terminal device according to the present invention.
Figure 2:
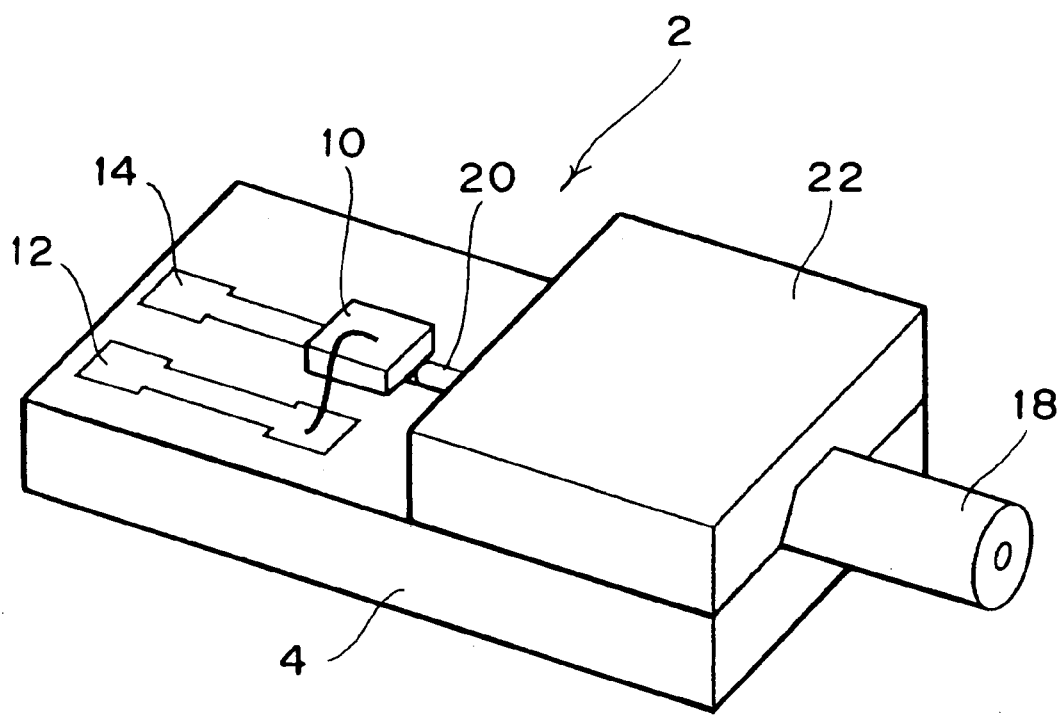
FIG. 2 is a perspective view of the optical module shown in FIG. 1 in its assembled condition.

Some preferred embodiments of the present invention will now be described with reference to the drawings. In the following description of the preferred embodiments, substantially the same parts will be denoted by the same reference numerals. Referring to FIGS. 1 and 2, there is shown an optical module 2 applied to a first preferred embodiment of the optical transmission terminal device according to the present invention. The optical module 2 has an optical component mounting substrate 4 formed of silicon. The upper surface of the substrate 4 is formed with grooves 6 and 8 for respectively receiving a ferrule 18 and a bare fiber 20. The grooves 6 and 8 are formed by anisotropic etching.

The substrate 4 is not limited to a silicon substrate, but a semiconductor substrate, ceramic substrate, glass substrate, etc. may be adopted. The ferrule 18 is a cylindrical ferrule formed of zirconia and having an outer diameter of 1.25 mm, for example. The bare fiber 20 is inserted and fixed in the ferrule 18, and one end portion of the bare fiber 20 projects from the ferrule 18. The front end of the bare fiber 20 is cleaved, and one end surface of the ferrule 18 opposite to the front end of the bare fiber 20 is polished. The cylindrical surfaces of the ferrule 18 and the bare fiber 20 are preliminarily metallized to allow soldering.

A photoelectric converter 10 such as a laser diode is mounted on the substrate 4, and a pair of feed electrodes 12 and 14 are formed on the substrate 4. The feed electrode 12 and the photoelectric converter 10 are connected by a gold wire 16. The term of "photoelectric converter" used in this specification means a device having both an opto-electric conversion function and an electro-optic conversion function. After the ferrule 18 and the bare fiber 20 are inserted into the grooves 6 and 8 of the substrate 4, respectively, a holder cover 22 formed of silicon is fixed by soldering to the upper surface of the substrate 4. Soldering portions of the substrate 4 and the holder cover 22 are preliminarily metallized.

Figure 3:
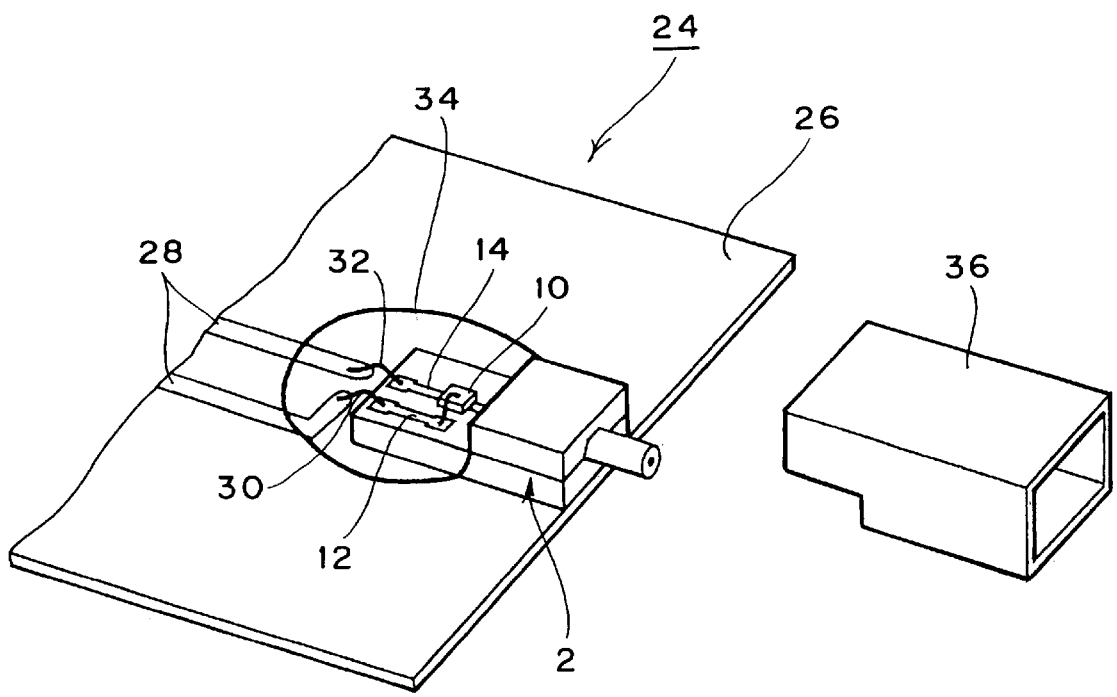
FIG. 3 is an exploded perspective view of an optical transmission terminal device according to the first preferred embodiment.
Figure 4:
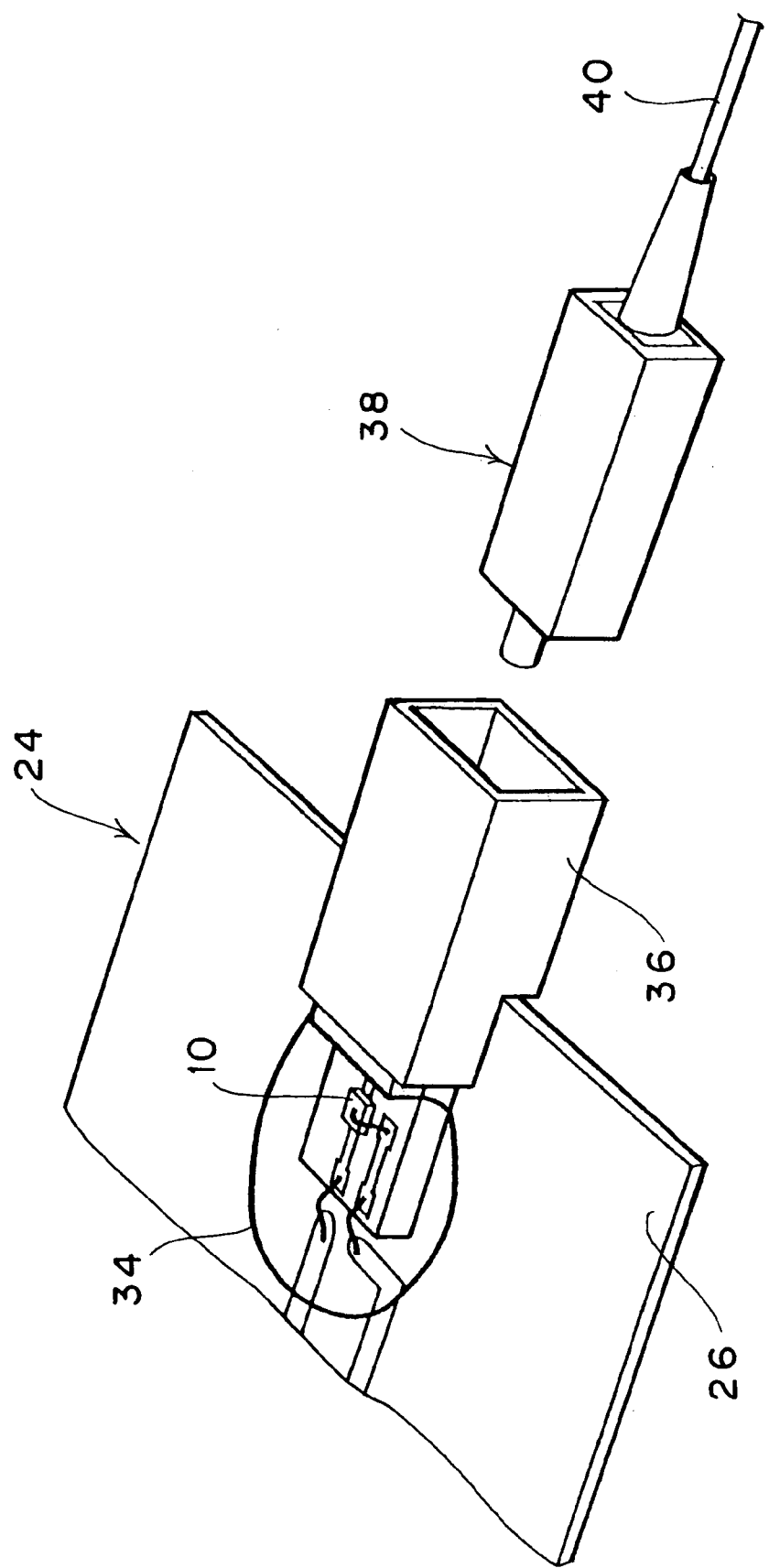
FIG. 4 is a perspective view of the optical transmission terminal device shown in FIG. 3 in its assembled condition.

Referring to FIG. 3, there is shown an exploded perspective view of an optical transmission terminal device 24 according to the first preferred embodiment of the present invention. FIG. 4 is a perspective view of the optical transmission terminal device 24 in the condition where an optical fiber connector housing 36 is mounted on the optical module 2. The optical module 2 is fixedly mounted on a printed wiring board 26 at a given position by an epoxy adhesive, for example. The feed electrodes 12 and 14 of the optical module 2 are connected through gold wires 30 and 32, respectively, to wiring patterns 28 formed on the printed wiring board 26.

A silicone resin 34 is applied so as to cover an optically coupled portion between the photoelectric converter 10 and the optical fiber 20 and an electrically connected portion between the feed electrodes 12 and 14 and the wiring patterns 28 by the gold wires 30 and 32. The silicone resin 34 applied is cured by heating at about 150° C. Although not shown, an electrical component such as an LSI is also mounted on the printed wiring board 26 in a similar manner. The optical fiber connector housing 36 corresponds to a commercially available MU type optical connector, and it is fixedly mounted to the optical module 2 as shown in FIG. 3. The optical fiber connector housing 36 is fixed to the optical module 2 by an epoxy adhesive, for example.

Figure 5:
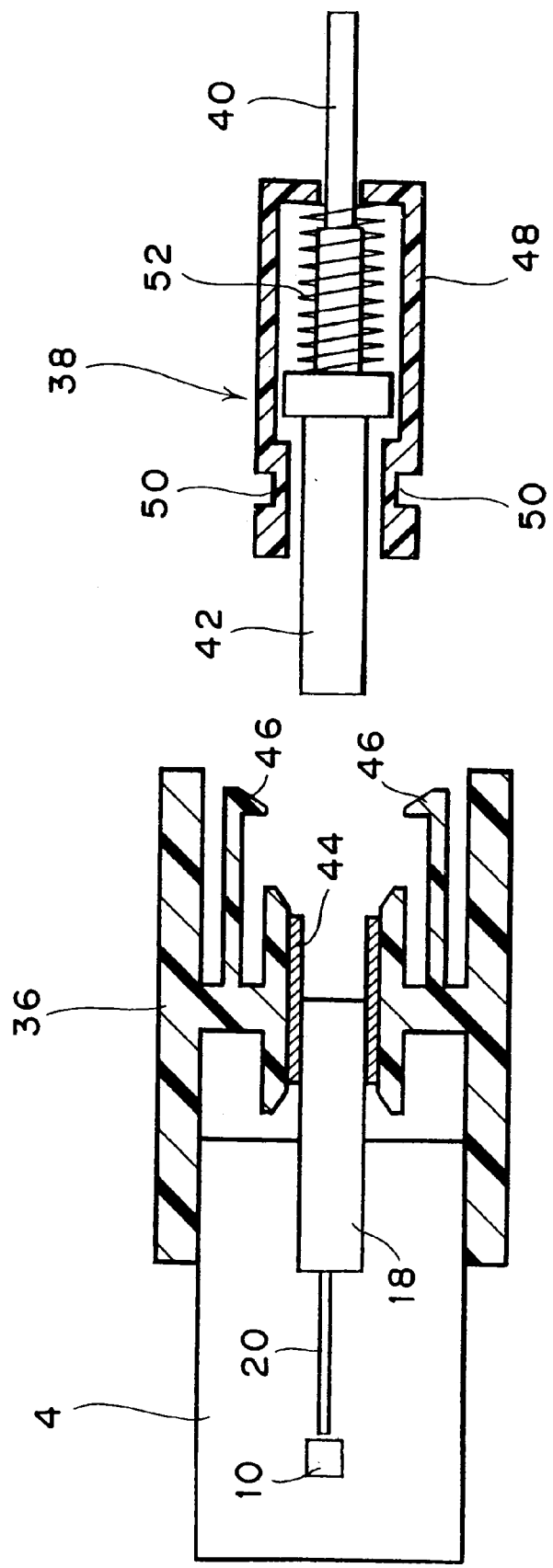
FIG. 5 is a sectional view of an optical connector shown in FIG. 4 in its disconnected condition.
Figure 6:
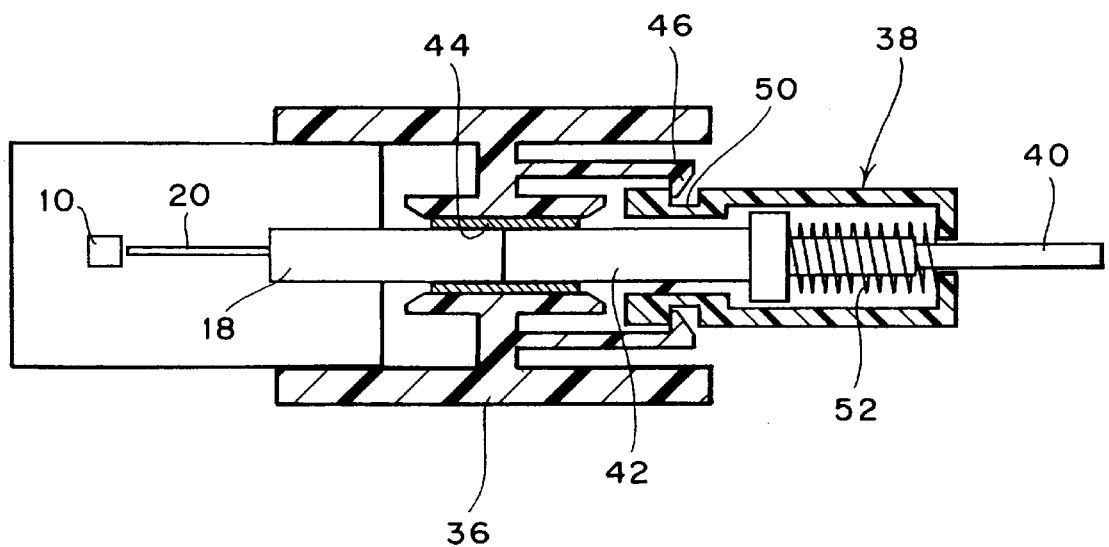
FIG. 6 is a sectional view of the optical connector in its connected condition.

As shown in FIG. 5, a C-shaped sleeve 44 formed of zirconia is inserted and fixed in the optical fiber connector housing 36. The optical fiber connector housing 36 is integrally formed with a pair of hooks 46 for holding an optical fiber connector 38. The optical fiber connector 38 has a housing 48 formed with a pair of notches 50 for engaging the hooks 46. A ferrule 42 is movably inserted in the housing 48, and an optical fiber 40 is inserted and fixed in the ferrule 42. A coil spring 52 is interposed between the ferrule 42 and the housing 48. As shown in FIG. 6, when the optical fiber connector 38 is inserted into the optical fiber connector housing 36, the hooks 46 come into engagement with the notches 50, and the end surfaces of the ferrules 18 and 42 come into pressure contact with each other by a biasing force of the coil spring 52.

Figure 7:
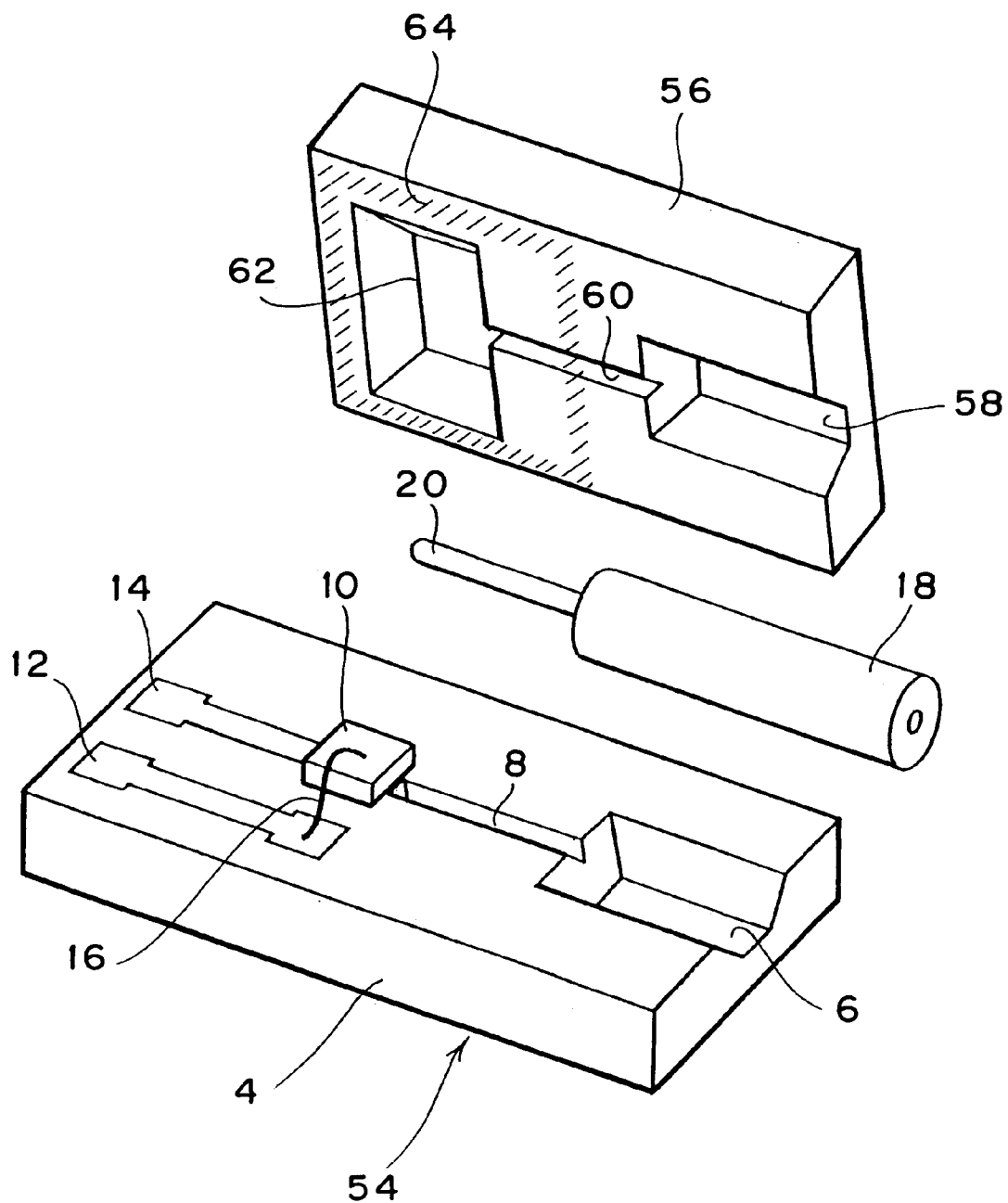
FIG. 7 is an exploded perspective view of an optical module applied to a second preferred embodiment of the optical transmission terminal device according to the present invention.
Figure 8:
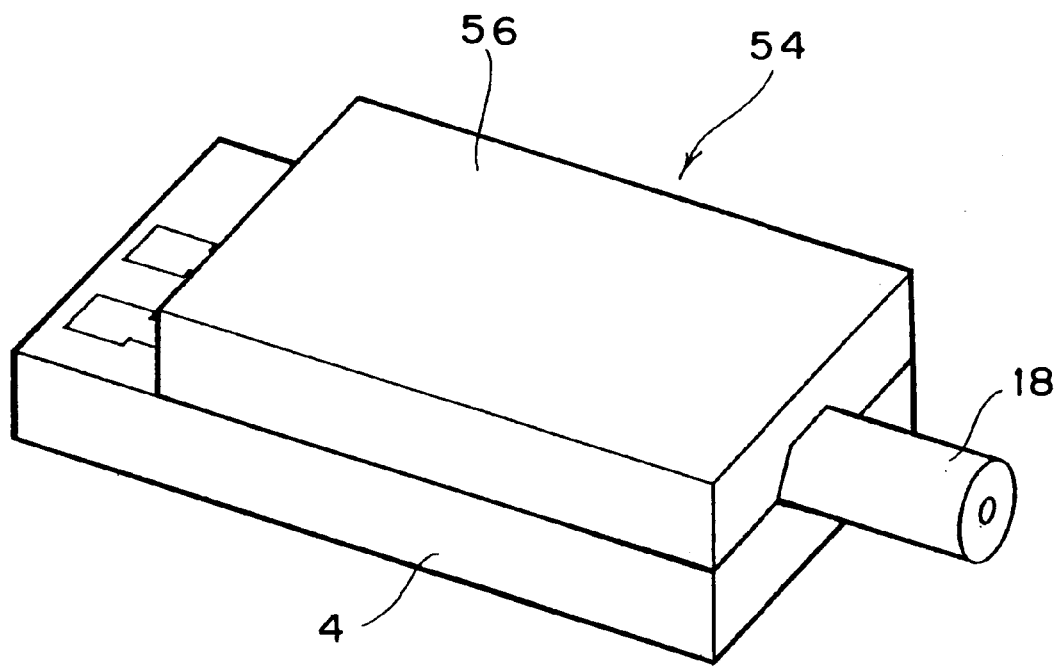
FIG. 8 is a perspective view of the optical module shown in FIG. 7 in its assembled condition.

Referring to FIG. 7, there is shown an exploded perspective view of an optical module 54 applied to a second preferred embodiment of the optical transmission terminal device according to the present invention. FIG. 8 is a perspective view of the optical module 54 in its assembled condition. The optical module 54 is different from the optical module 2 shown in FIGS. 1 and 2 in the configuration of a holder cover 56. The holder cover 56 is formed of silicon, and it is formed with grooves 58 and 60 for receiving a ferrule 18 and a bare fiber 20, respectively, and a recess 62 for encapsulating a photoelectric converter 10. These grooves and recess are formed by anisotropic etching. An insulating thermoplastic resin is preliminarily applied to a lower bonding surface 64 of the holder cover 56. The lower surface of the substrate 4 is preliminarily metallized. After the ferrule 18 and the bare fiber 20 are inserted into the grooves 6 and 8 of the substrate 4, respectively, the holder cover 56 is fixedly mounted on the substrate 4 by the thermoplastic resin adhesive so that the ferrule 18 and the bare fiber 20 are received in the grooves 58 and 60, respectively, and the photoelectric converter 10 is received in the recess 62. Accordingly, the holder cover 56 is fixed to the substrate 4, and simultaneously the photoelectric converter 10 is hermetically sealed in the recess 62 by the thermoplastic resin.

Figure 9:
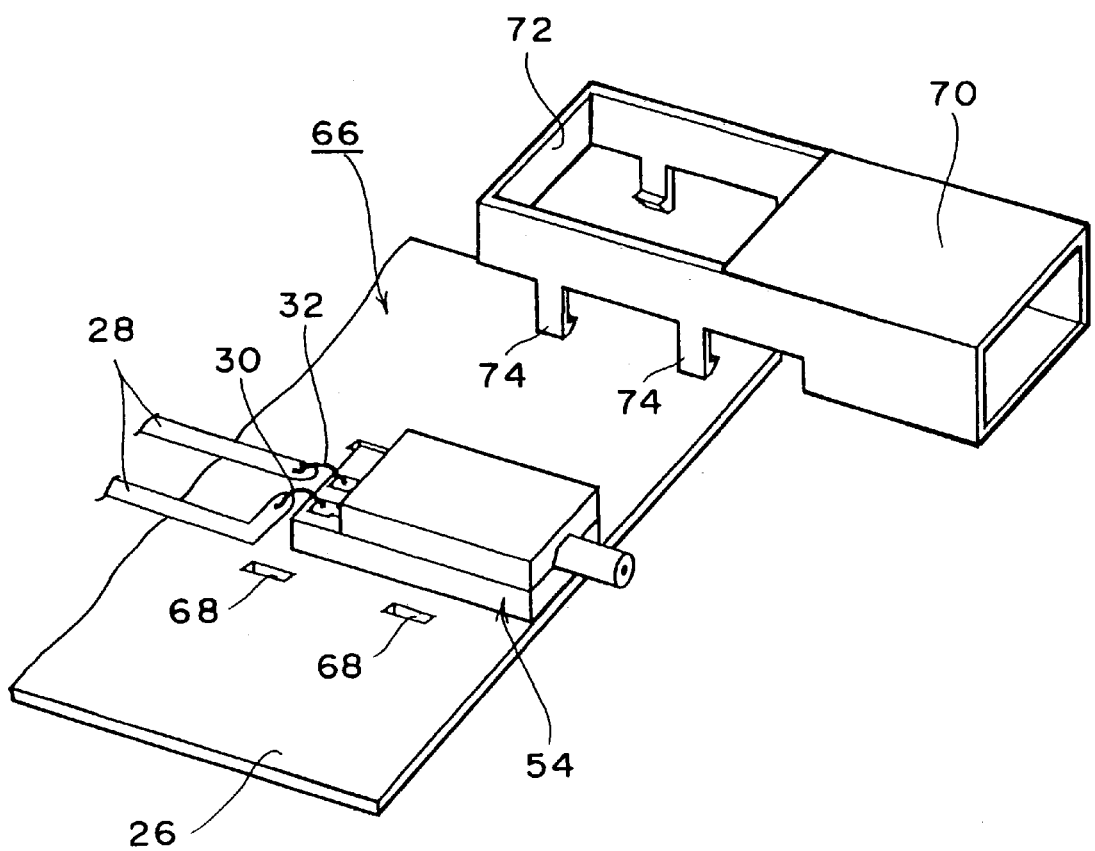
FIG. 9 is an exploded perspective view of an optical transmission terminal device according to the second preferred embodiment.
Figure 10:
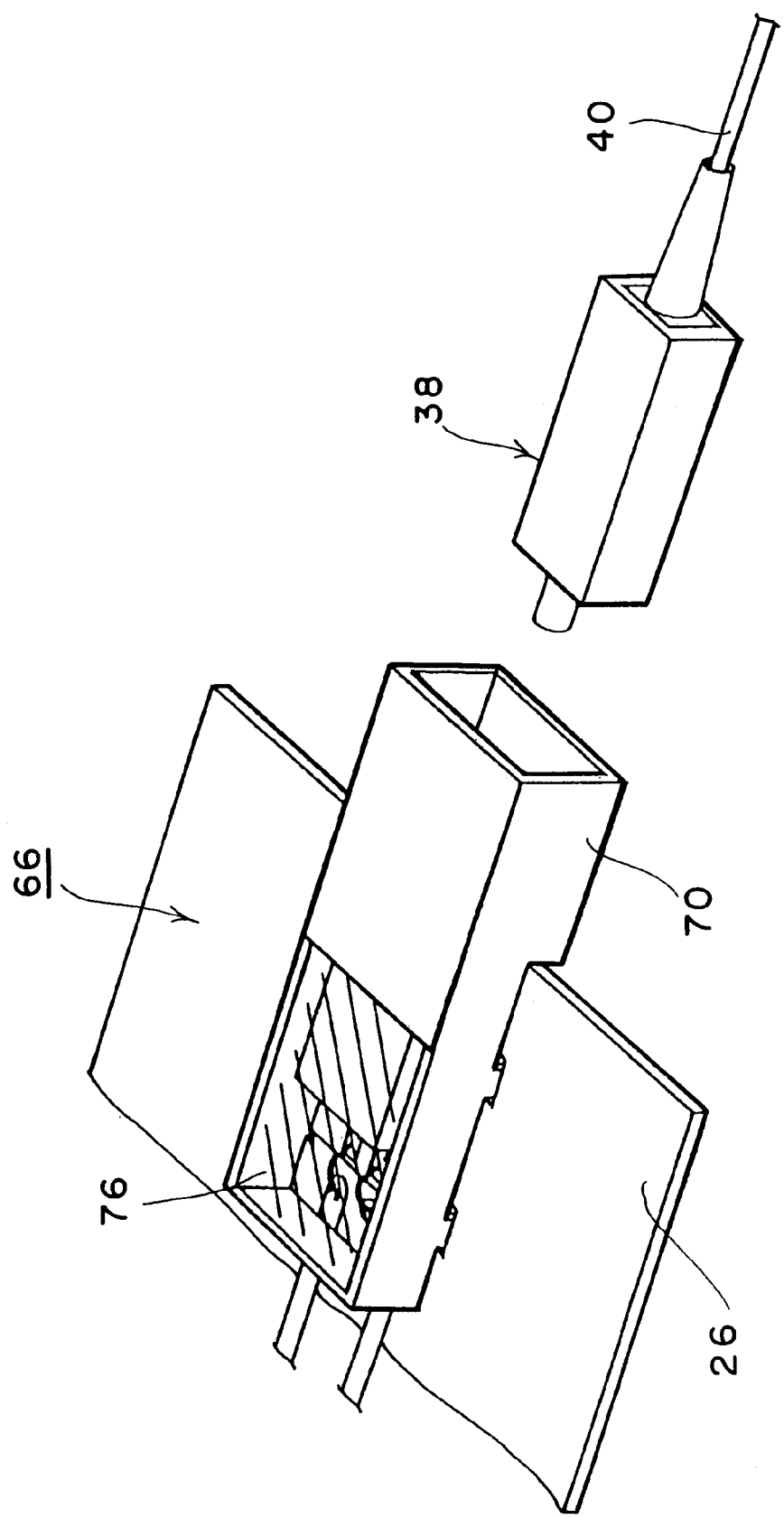
FIG. 10 is a perspective view of the optical transmission terminal device shown in FIG. 9 in its assembled condition.
Figure 11:
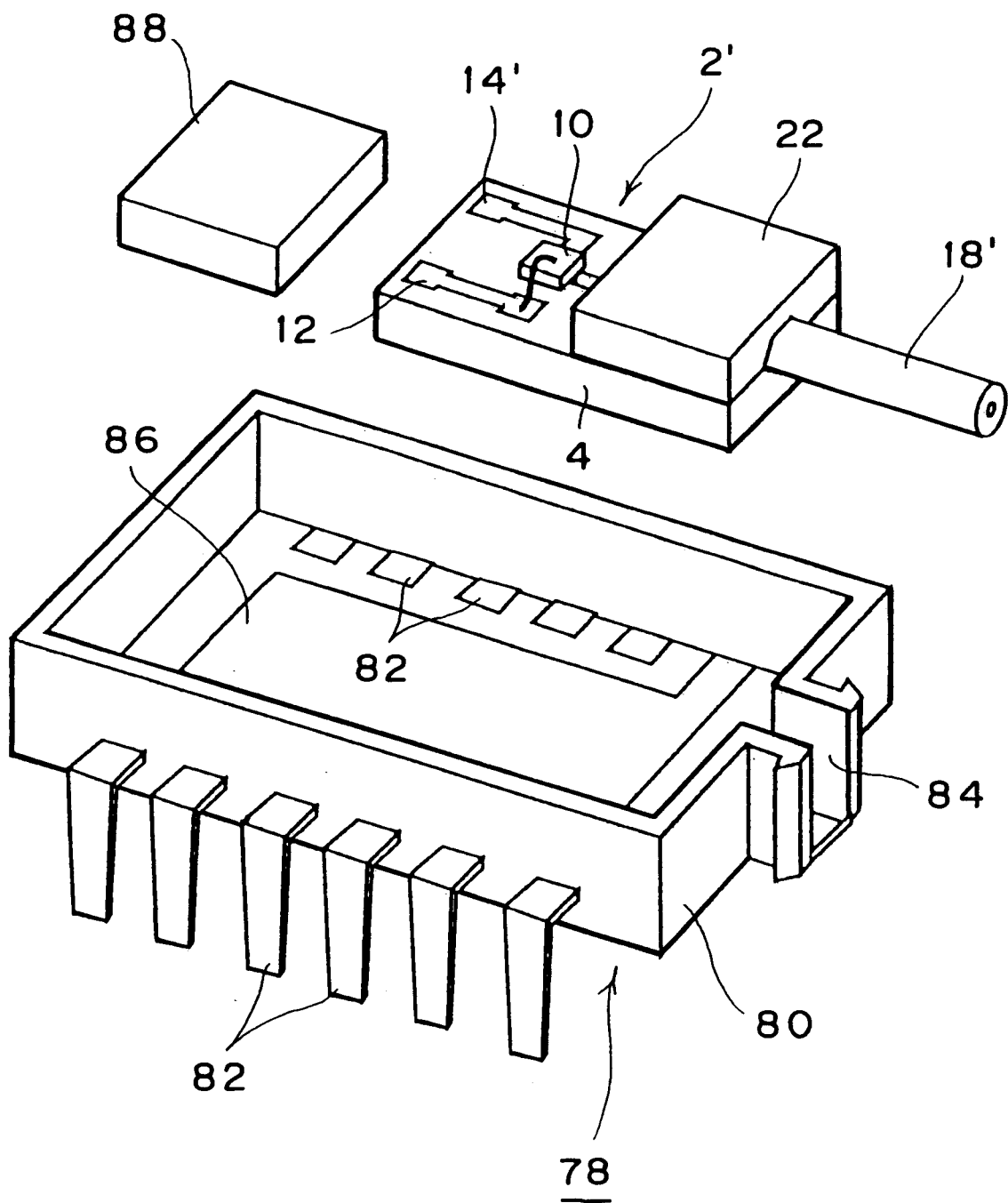
FIG. 11 is an exploded perspective view of an optical transmission terminal device according to a third preferred embodiment of the present invention.

Referring to FIG. 9, there is shown an exploded perspective view of an optical transmission terminal device 66 according to the second preferred embodiment of the present invention. FIG. 10 is a perspective view of the optical transmission terminal device 66 in its assembled condition. A pattern of PbSn solder paste is preliminarily printed by a screen printing process on a printed wiring board 26 at given device mounting positions. The optical module 54 and an electrical component such as an LSI (not shown) are placed on the given solder pattern of the printed wiring board 26. Thereafter, the optical module 54 and the electrical component are soldered by reflow soldering in a conveyor furnace, thereby being simultaneously fixed to the printed wiring board 26. Thereafter, the feed electrodes 12 and 14 of the optical module 54 and the wiring patterns 28 on the printed wiring board 26 are connected together by gold wires 30 and 32. The printed wiring board 26 is formed with a plurality of holes 68 for mounting an optical fiber connector housing 70.

The optical fiber connector housing 70 has an opening 72 for receiving an electrically connected portion between the optical module 54 and the printed wiring board 26, and a plurality of hooks 74 for engaging the holes 68 of the printed wiring board 26. By inserting the hooks 74 into the holes 68, the optical fiber connector housing 70 is mounted on the printed wiring board 26. As shown in FIG. 10, the opening 72 of the optical fiber connector housing 70 mounted on the printed wiring board 26 is filled with an epoxy resin 76 to thereby simultaneously carry out resin molding of the electrically connected portion and fixing of the optical fiber connector housing 70 to the printed wiring board 26.

Referring to FIGS. 11 to 14, there is shown an optical transmission terminal device 78 according to a third preferred embodiment of the present invention. In this preferred embodiment, an optical module 2' is similar to the optical module 2 shown in FIGS. 1 and 2, but different therefrom in that a feed electrode 14' is located laterally farther than the feed electrode 14 and that a ferrule 18' projects from the substrate 4 longer than the ferrule 18. Reference numeral 80 denotes a casing formed of a heat-resisting resin. A plurality of lead terminals 82 are mounted on both side walls of the casing 80, and an opening 84 is formed through one end wall of the casing 80. A metal sheet 86 is mounted on the bottom surface of the casing 80, and is connected to at least one of the lead terminals 82, thereby forming a heat dissipation path.

Figure 12:
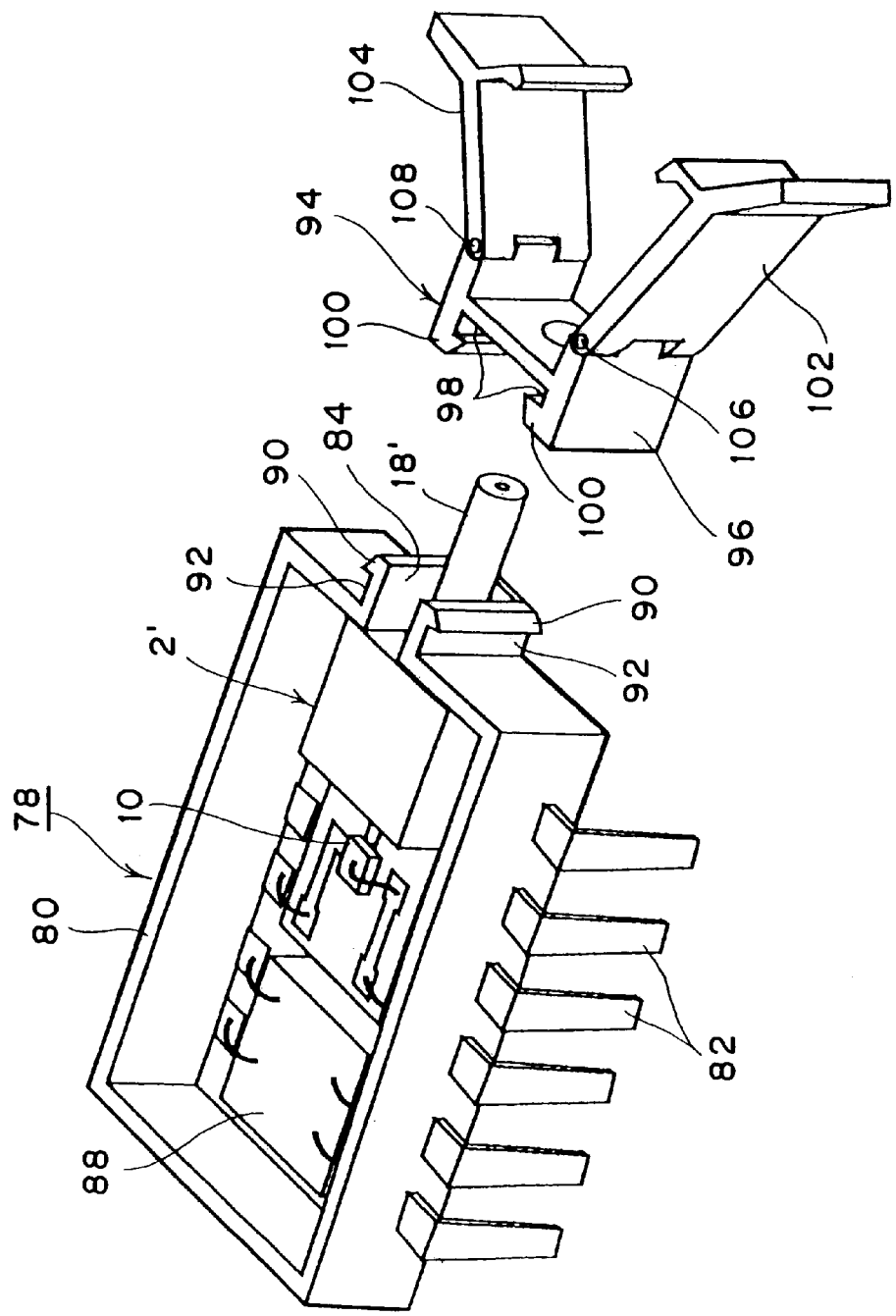
FIG. 12 is an exploded perspective view of the optical transmission terminal device shown in FIG. 11 in the condition prior to mounting an optical fiber connector housing.

The optical module 2' is received in the casing 80 so that the ferrule 18' projects from the opening 84, and an LSI chip 88 is also received in the casing 80. Both the optical module 2' and the LSI chip 88 are mounted on the metal sheet 86 of the casing 80. As shown in FIG. 12, the casing 80 is formed with a pair of projections 90 and a pair of recesses 92 adjacent to the opening 84. Reference numeral 94 denotes an optical fiber connector housing having a body 96. The body 96 is formed with a pair of recesses 98 for engaging the projections 90 of the casing 80 and a pair of projections 100 for engaging the recesses 92 of the casing 80. A pair of connector holding members 102 and 104 are pivotably mounted to the body 96 through pins 106 and 108, respectively.

Figure 13:
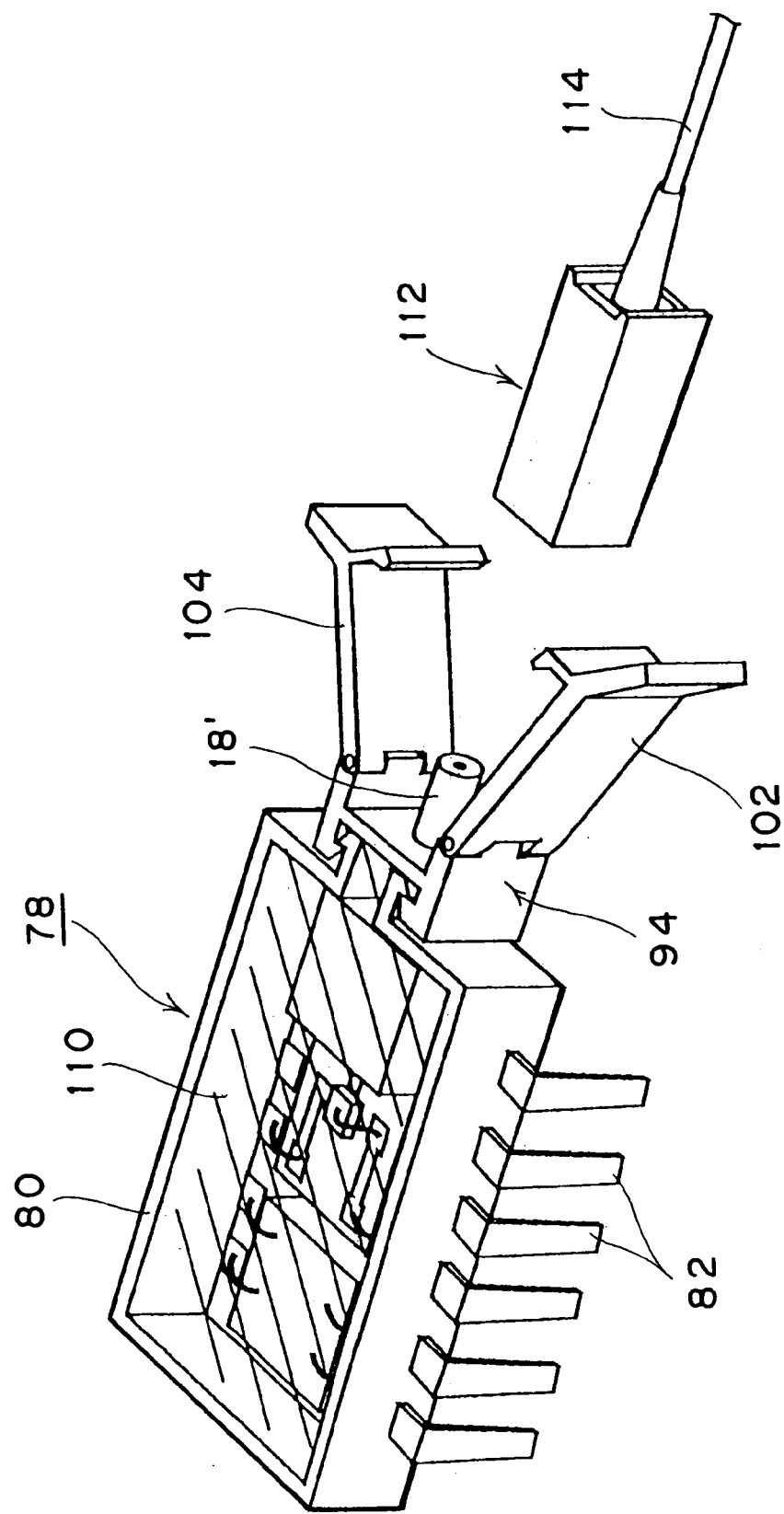
FIG. 13 is a perspective view of the optical transmission terminal device shown in FIG. 12 in its assembled condition.
Figure 14:
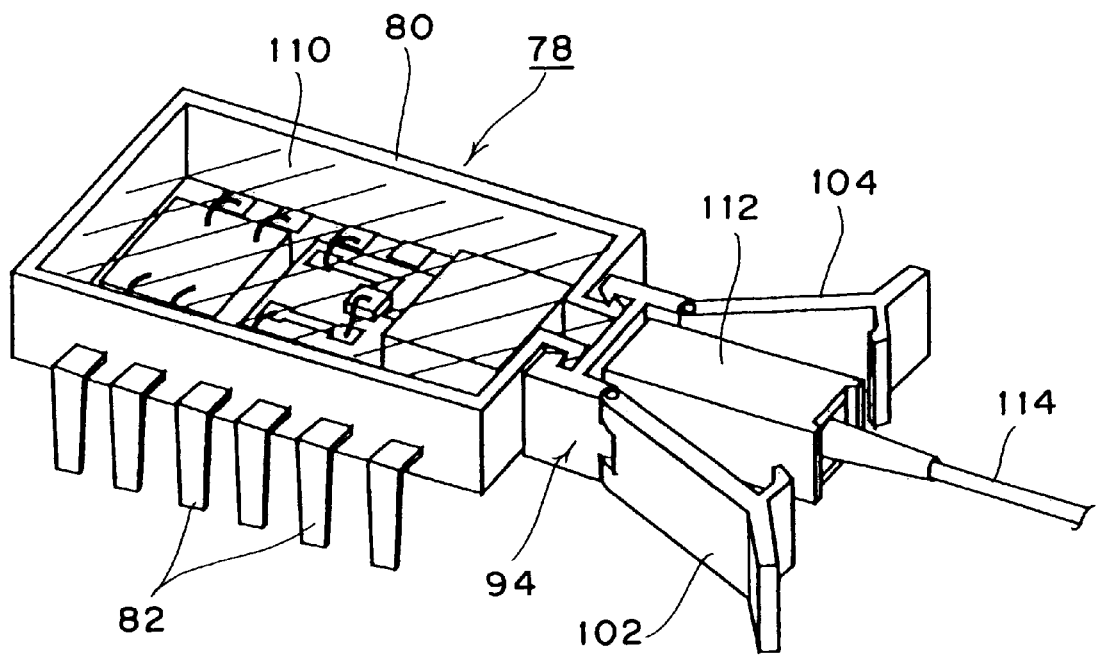
FIG. 14 is a perspective view of the optical transmission terminal device shown in FIG. 13 in the condition that an optical fiber connector is connected to the optical fiber connector housing.

By engaging the projections 100 of the optical fiber connector housing 94 with the recesses 92 of the casing 80 and engaging the projections 90 of the casing 80 with the recesses 98 of the optical fiber connector housing 94, the optical fiber connector housing 94 is mounted to the casing 80 in such a manner as to close the opening 84. The feed electrodes 12 and 14' of the optical module 2' and electrode pads of the LSI chip 88 are connected through gold wires to the lead terminals 82 of the casing 80. As shown in FIG. 13, the inside space of the casing 80 is filled with a silicone resin 110, and the silicone resin 110 is cured to thereby simultaneously carry out resin molding of the optically coupled portion and the electrically connected portion and fixing of the ferrule 18' for reinforcement. Thereafter, the lead terminals 82 of the casing 80 are connected by flow soldering to a printed wiring board (not shown).

Figure 15:
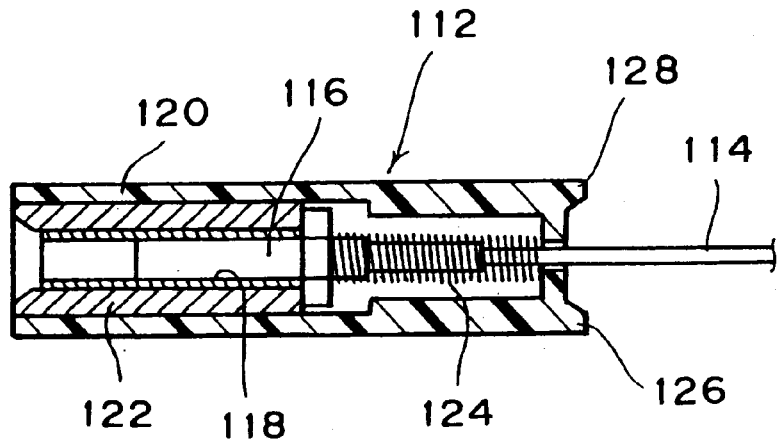
FIG. 15 is a sectional view of the optical fiber connector shown in FIG. 14.
Figure 16:
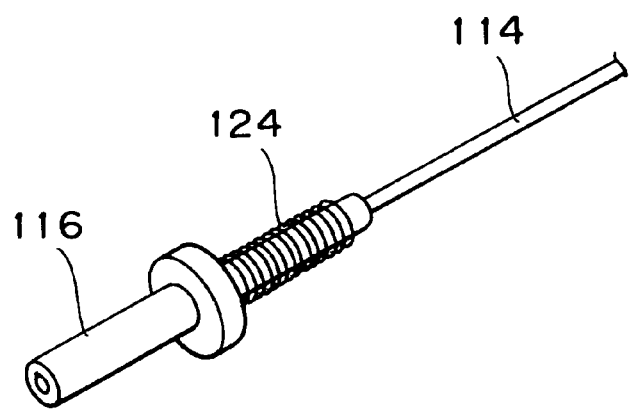
FIG. 16 is a perspective view of a ferrule shown in FIG. 15.
Figure 17:
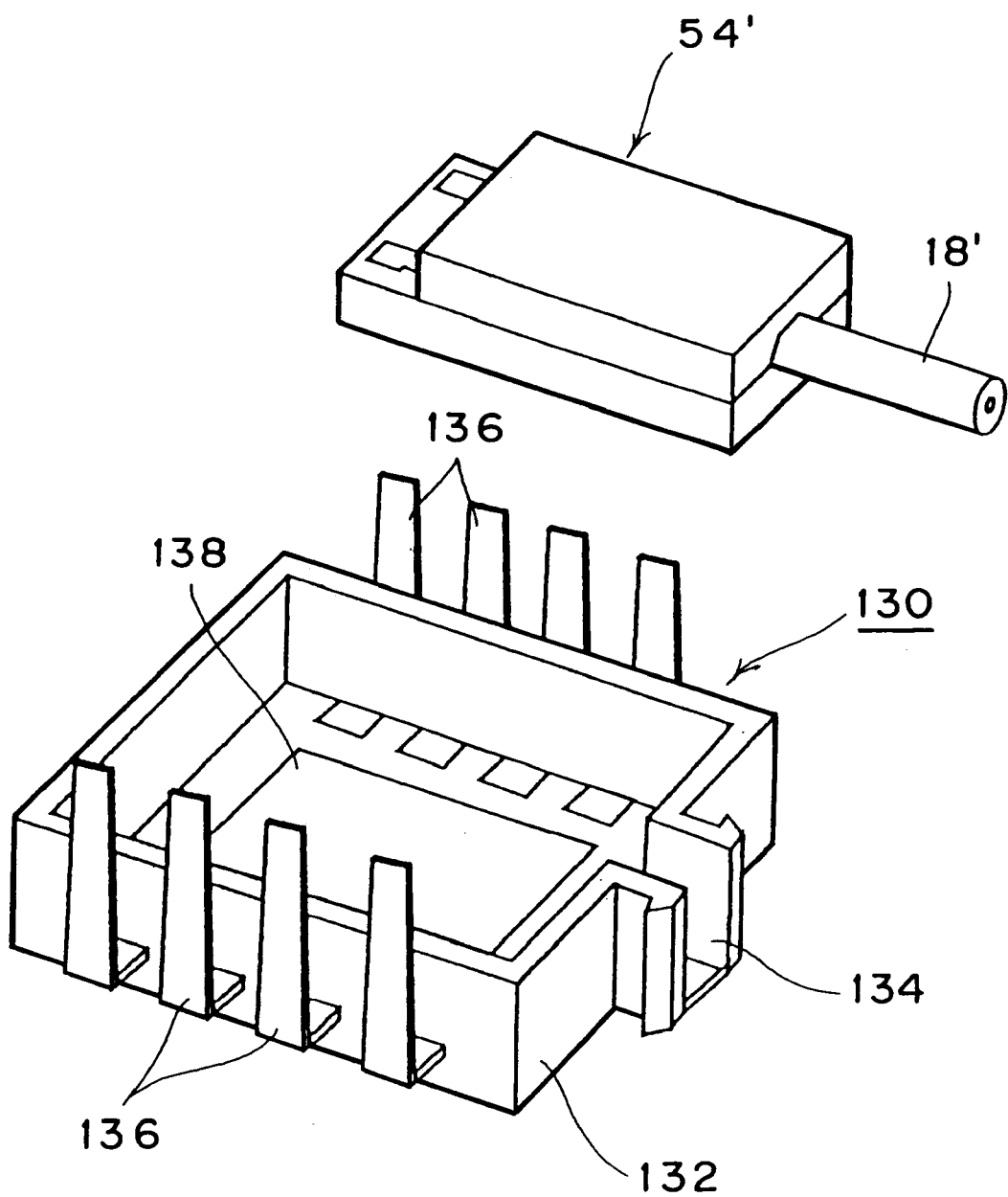
FIG. 17 is an exploded perspective view of an optical transmission terminal device according to a fourth preferred embodiment of the present invention.
Figure 18:
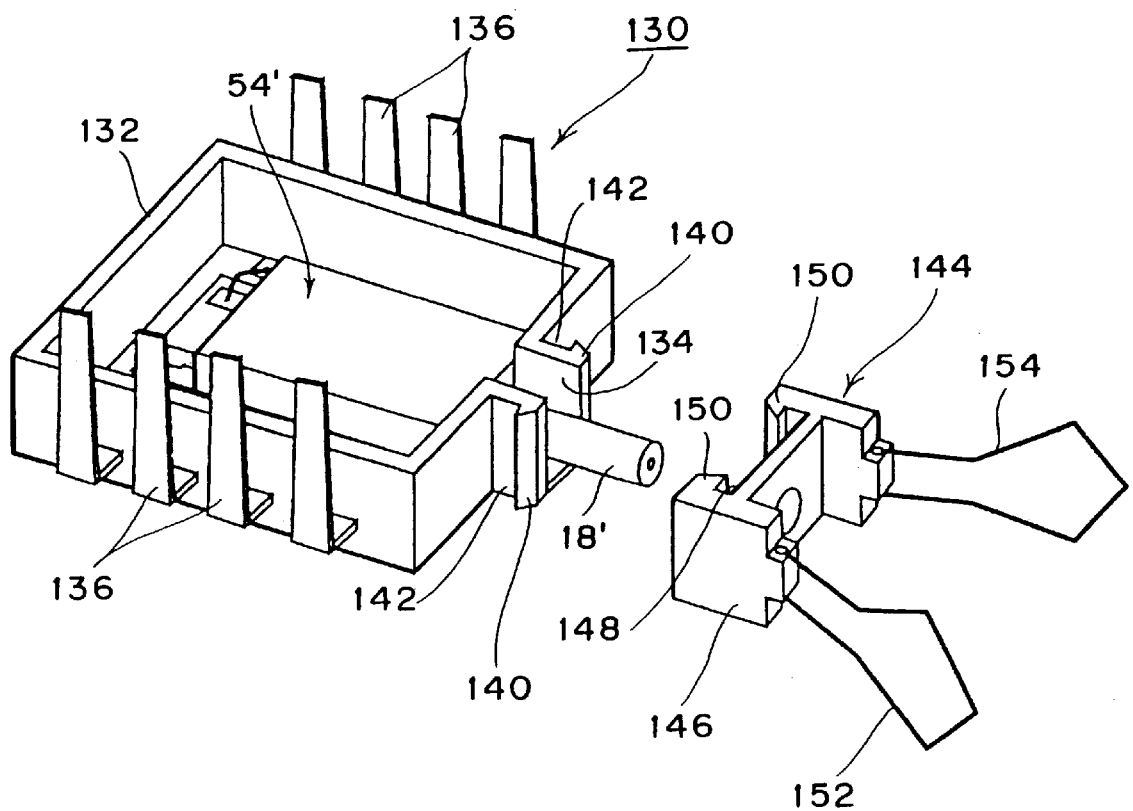
FIG. 18 is an exploded perspective view of the optical transmission terminal device shown in FIG. 17 in the condition prior to mounting an optical fiber connector housing.

Referring to FIG. 15, there is shown a sectional view of an optical fiber connector 112 to be connected to the optical module 2'. An optical fiber 114 is inserted and fixed in a ferrule 116. The ferrule 116 is movably inserted in a C-shaped sleeve 118. The C-shaped sleeve 118 is inserted through a sleeve 122 in a housing 120 formed of a synthetic resin. A coil spring 124 is interposed between the ferrule 116 and the housing 120 so as to bias the ferrule 116 leftward as viewed in FIG. 15. The housing 120 is formed with projections 126 and 128 for respectively engaging the connector holding members 102 and 104 of the optical fiber connector housing 94.

By jointing the optical fiber connector 112 to the ferrule 18' of the optical module 2' and pivoting the connector holding members 102 and 104 about the pins 106 and 108 to engage them with the projections 126 and 128 of the housing 120, the ferrule 18' of the optical module 2' and the ferrule 116 of the optical fiber connector 112 come into pressure contact with each other by a biasing force of the coil spring 124, thereby achieving optical connection. According to this preferred embodiment, the optical connection of the ferrules 18' and 116 can be achieved by engaging the connector holding members 102 and 104 with the projections 126 and 128 of the housing 120, respectively. Accordingly, it is possible to prevent the occurrence of stress concentration at a soldered portion between the lead terminals 82 of the optical module and the printed wiring board when connecting or disconnecting the optical fiber connector 112.

Referring to FIGS. 17 to 21, there is shown an optical transmission terminal device 130 according to a fourth preferred embodiment of the present invention. In this preferred embodiment, an optical module 54' is similar to the optical module 54 shown in FIGS. 7 and 8, and a casing 132 is similar to the casing 80 shown in FIG. 11 in such a manner that the casing 132 has a plurality of lead terminals 136 and an opening 134 for allowing projection of a ferrule 18'. A metal block 138 having radiation fins 158 (see FIG. 20) on the lower surface is mounted through the bottom surface of the casing 132.

As similar to the third preferred embodiment, the optical module 54' is received in the casing 132 in such a manner that the ferrule 18' projects from the opening 134, and is fixedly mounted on the metal block 138 by an epoxy resin. The casing 132 is formed with a pair of projections 140 and a pair of recesses 142 adjacent to the opening 134. Reference numeral 144 denotes a optical fiber connector housing having a body 146. The body 146 has a pair of recesses 148 for engaging the projections 140 of the casing 132 and a pair of projections 150 for engaging the recesses 142 of the casing 132. A pair of connector holding members 152 and 154 each formed from a steel wire are pivotably mounted to the body 146.

Figure 19:
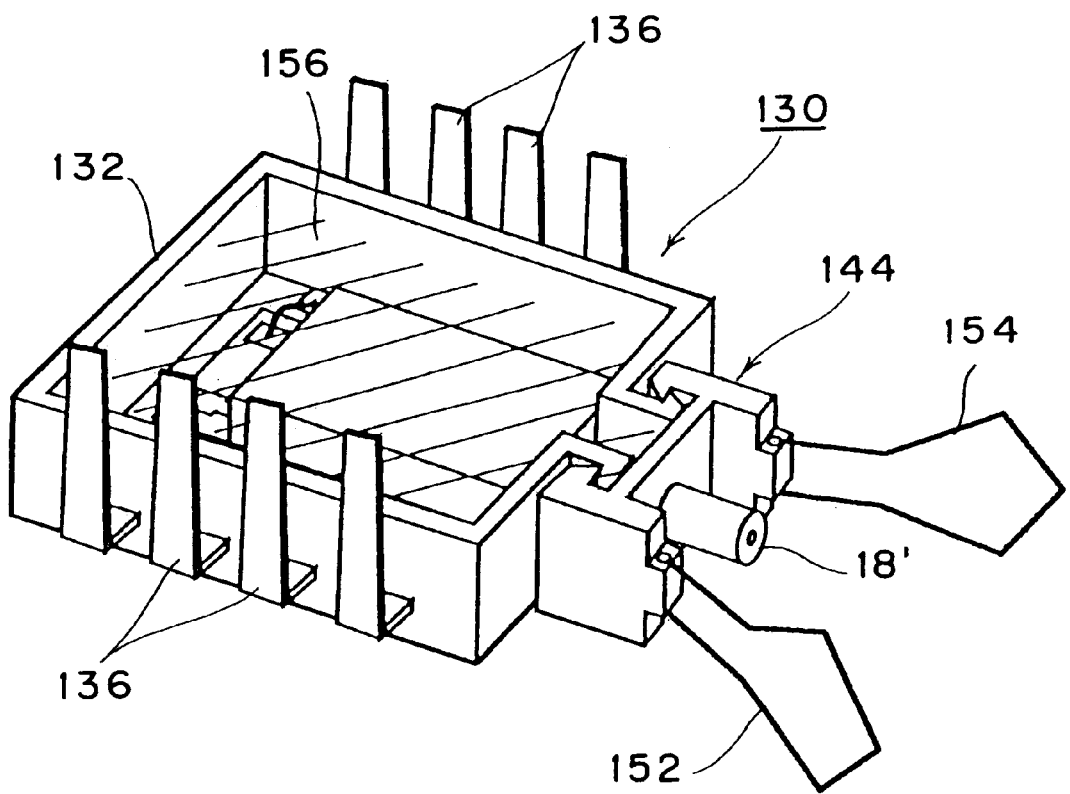
FIG. 19 is a perspective view of the optical transmission terminal device shown in FIG. 18 in its assembled condition.

By engaging the projections 150 of the optical fiber connector housing 144 with the recesses 142 of the casing 132 and engaging the projections 140 of the casing 132 with the recesses 148 of the optical fiber connector housing 144, the optical fiber connector housing 144 is mounted to the casing 132 so as to close the opening 134. Feed electrodes of the optical module 54' are connected through gold wires to the lead terminals 136 of the casing 132. As shown in FIG. 19, the inside space of the casing 132 is filled with an epoxy resin 156, and the epoxy resin 156 is cured to thereby simultaneously carry out resin molding of the electrically connected portion and fixing of the ferrule 18' for reinforcement.

Figure 20:
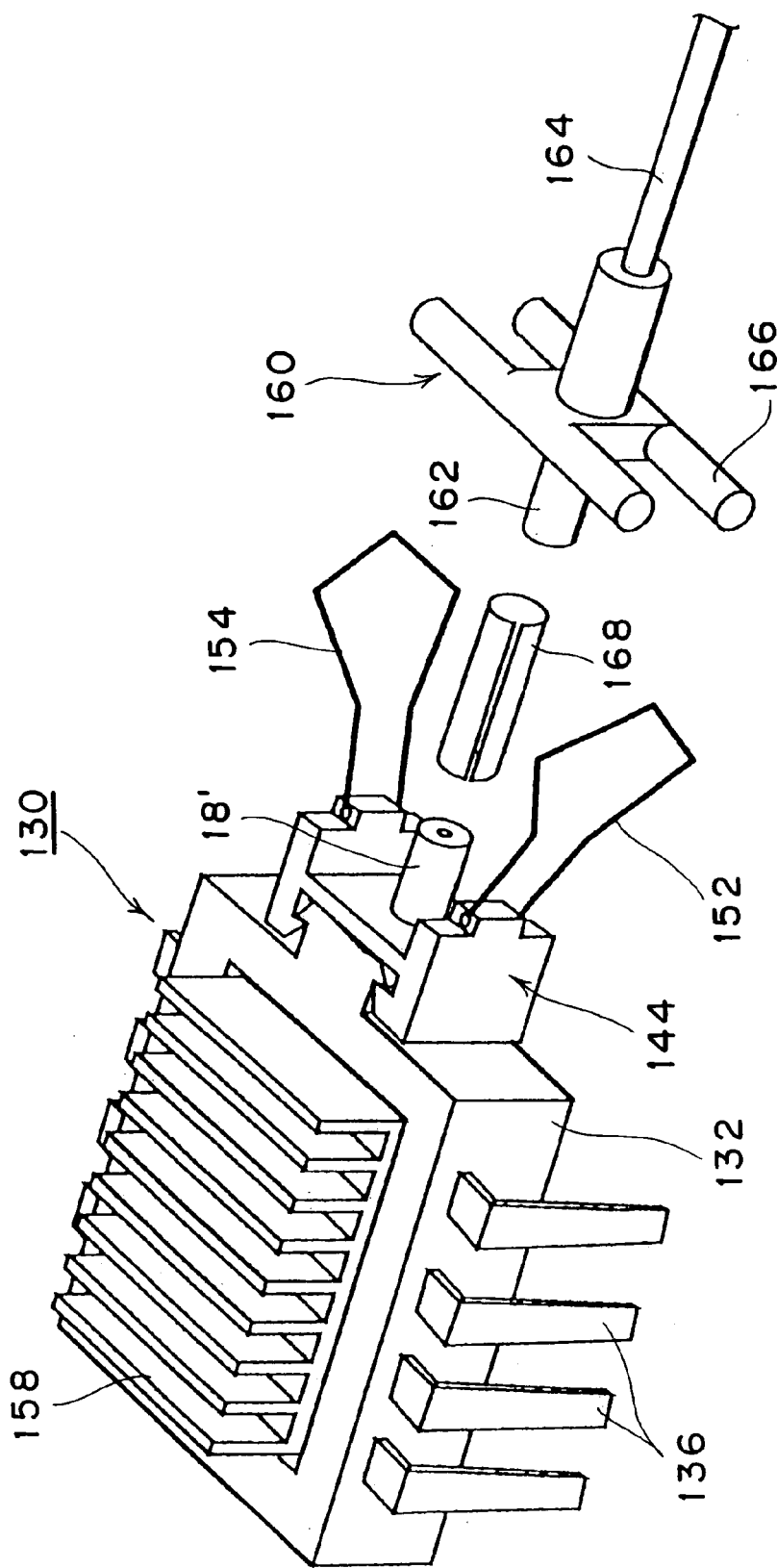
FIG. 20 is a perspective view of the optical transmission terminal device shown in FIG. 19 in the condition prior to connecting an optical fiber connector to the optical fiber connector housing.
Figure 21:
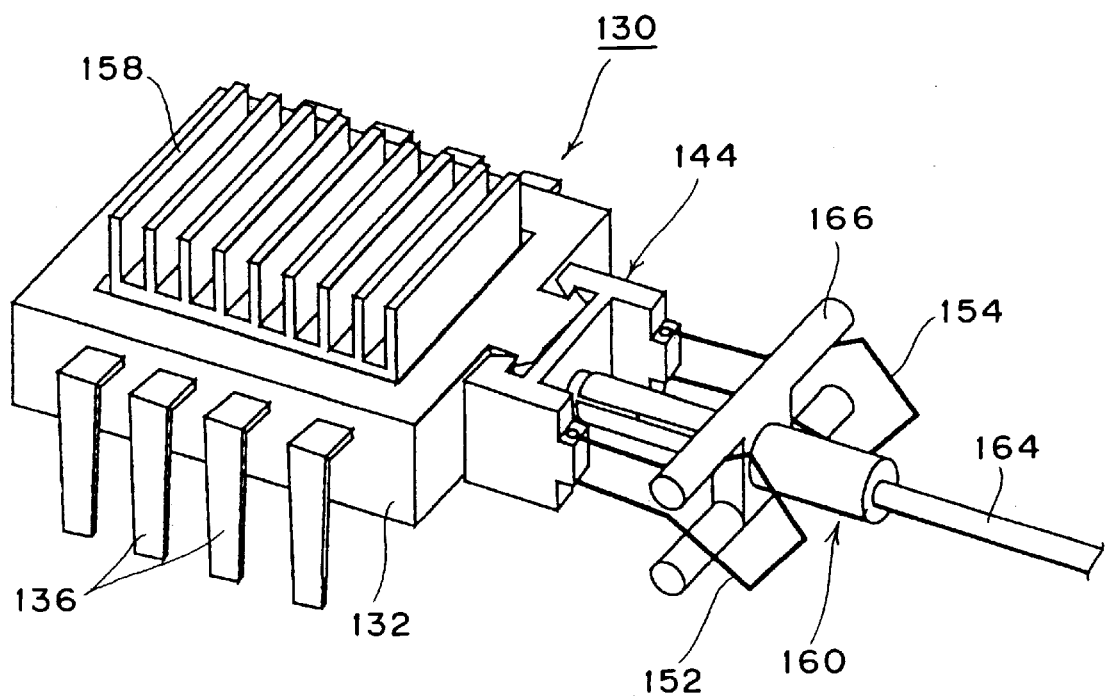
FIG. 21 is a perspective view of the optical transmission terminal device shown in FIG. 20 in the condition that the optical fiber connector is connected to the optical fiber connector housing.

Thereafter, the casing 132 is reversed in such a manner that the radiation fins 158 face the upper side as shown in FIG. 20, and the lead terminals 136 of the casing 132 are connected by flow soldering to a printed wiring board (not shown). Reference numeral 160 denotes an optical fiber connector including a ferrule 162 and an H-shaped flange 166 fixed to the ferrule 162. An optical fiber 164 is inserted and fixed in the ferrule 162.

By jointing the ferrule 162 of the optical fiber connector 160 through a C-shaped sleeve 168 to the ferrule 18' of the optical module 54' and engaging the connector holding members 152 and 154 with the H-shaped flange 166 of the optical fiber connector 160, the optical fiber connector 160 is connected to the optical module 54'. An elastic restoring force of the connector holding members 152 and 154 formed from steel wires is generated by the engagement of the members 152 and 154 with the H-shaped flange 166, acting in a direction where the ferrule 162 comes into pressure contact with the ferrule 18', thereby achieving optical connection of the ferrules 18' and 162. Accordingly, it is possible to prevent the occurrence of stress concentration at a soldered portion between the lead terminals 136 of the optical module 54' and the printed wiring board.

Figure 22:
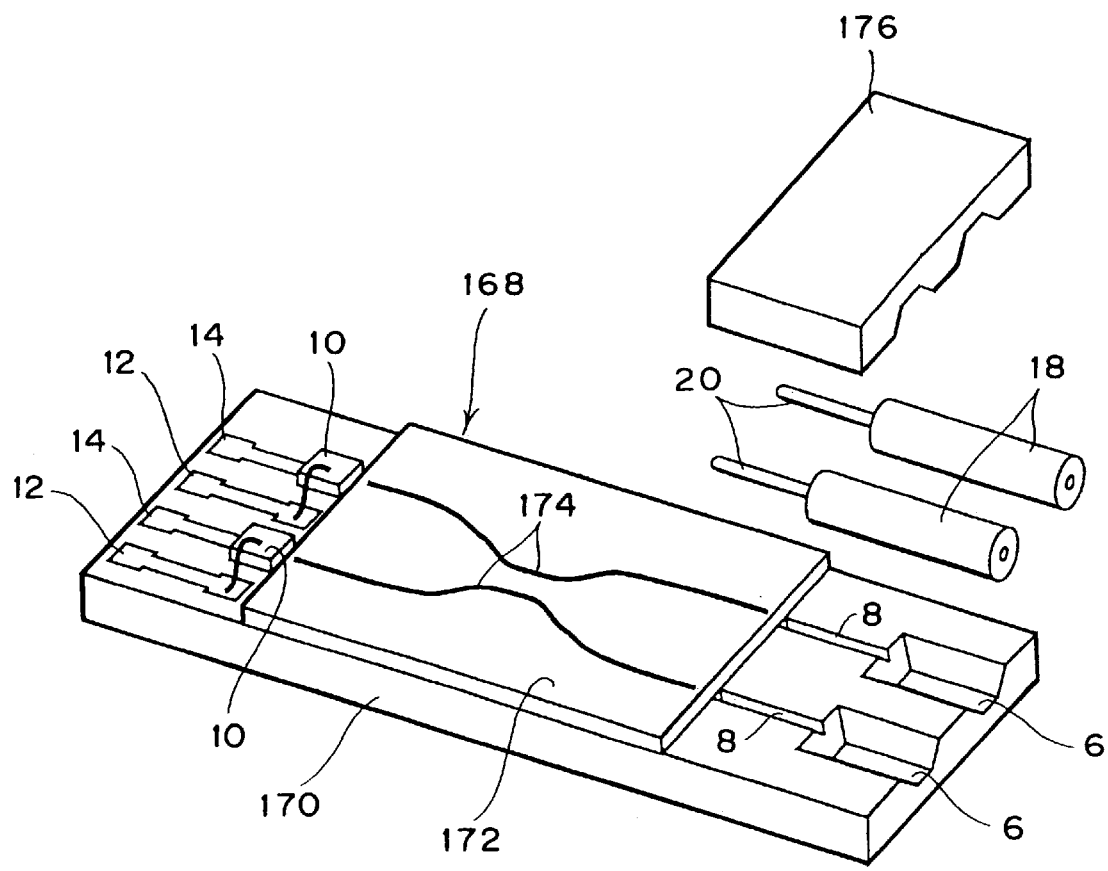
FIG. 22 is an exploded perspective view of an optical module applied to a fifth preferred embodiment of the optical transmission terminal device according to the present invention.
Figure 23:
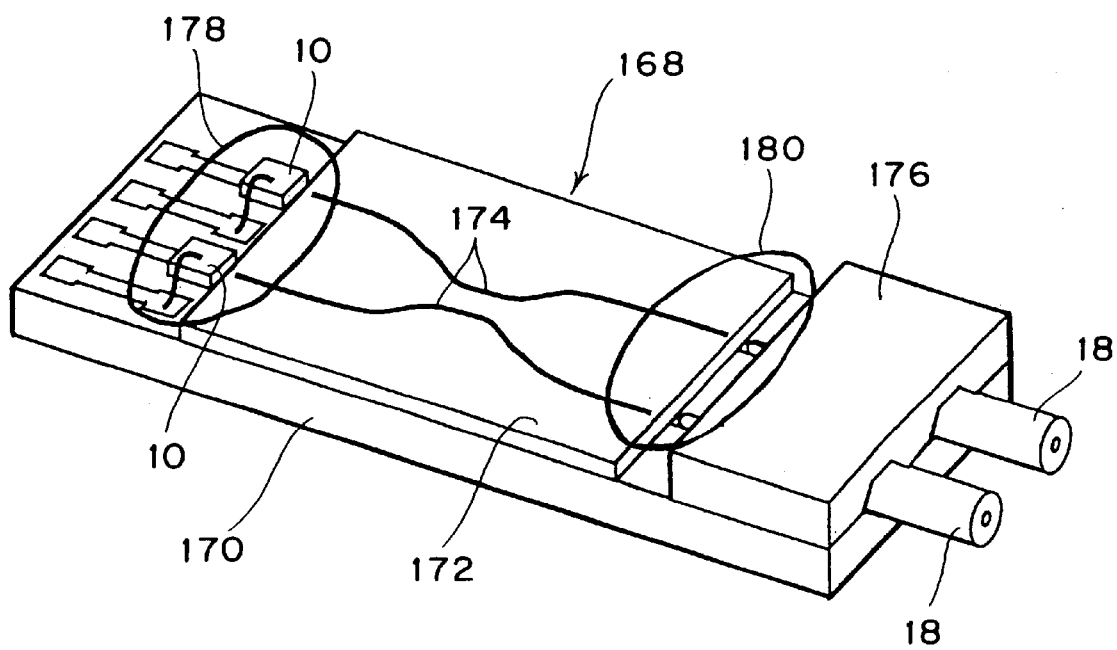
FIG. 23 is a perspective view of the optical module shown in FIG. 24 in its assembled condition.

Referring to FIGS. 22 and 23, there is shown an optical module 168 applied to a fifth preferred embodiment of the optical transmission terminal device according to the present invention. Reference numeral 170 denotes an optical component mounting substrate. A waveguide substrate 172 formed with optical waveguides 174 is mounted on the substrate 170. The substrate 170 has two grooves 6 for receiving two ferrules 18 and two grooves 8 for receiving two bare fibers 20. Two photoelectric converters 10 are mounted on the substrate 170, and feed electrodes 12 and 14 for each photoelectric converter 10 are formed on the substrate 170.

After the ferrules 18 and the bare fibers 20 are inserted into the grooves 6 and 8, respectively, a holder cover 176 is fixed to the substrate 170 by soldering so as to cover the ferrules 18 and the bare fibers 20. The substrate 170 and the holder cover 176 are formed of silicon, for example. As shown in FIG. 23, a silicone resin 178 is applied to optically coupled portions between the optical waveguides 174 and the photoelectric converters 10, and a silicone resin 180 is applied to optically coupled portions between the optical waveguides 174 and the optical fibers 20. The silicone resins 178 and 180 applied are cured to thereby achieve hermetic sealing.

Figure 24:
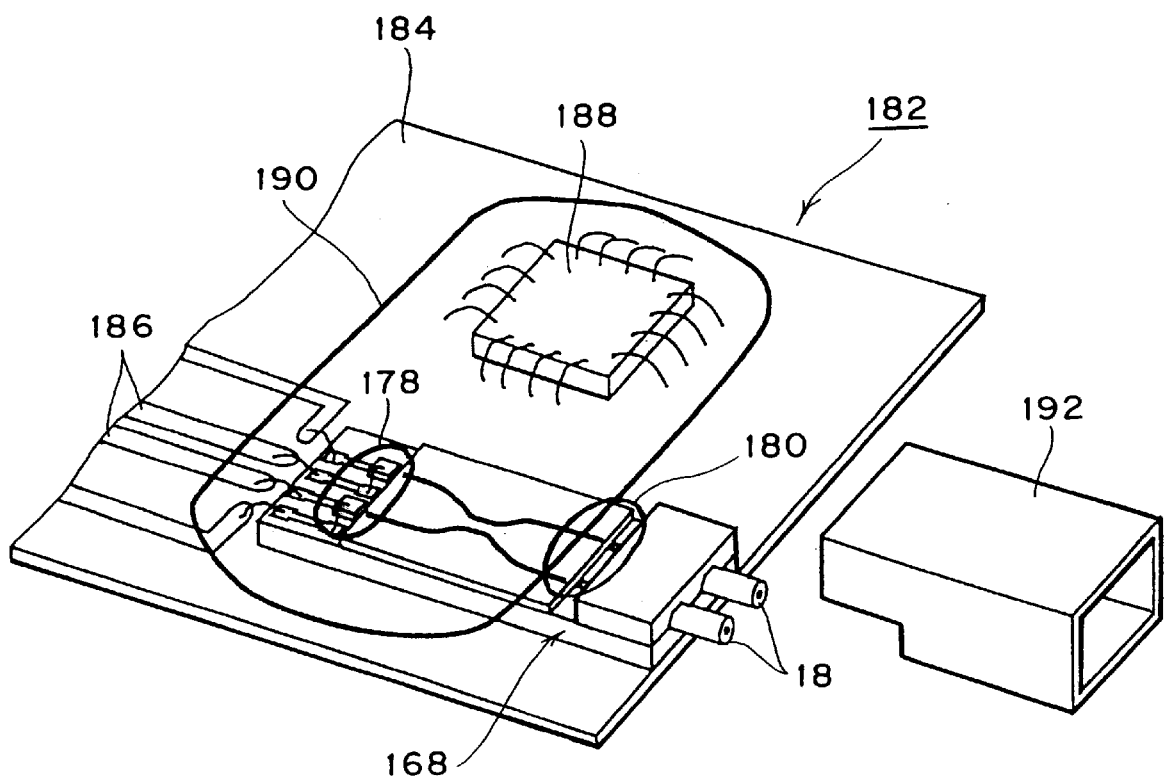
FIG. 24 is an exploded perspective view of an optical transmission terminal device according to the fifth preferred embodiment.
Figure 25:
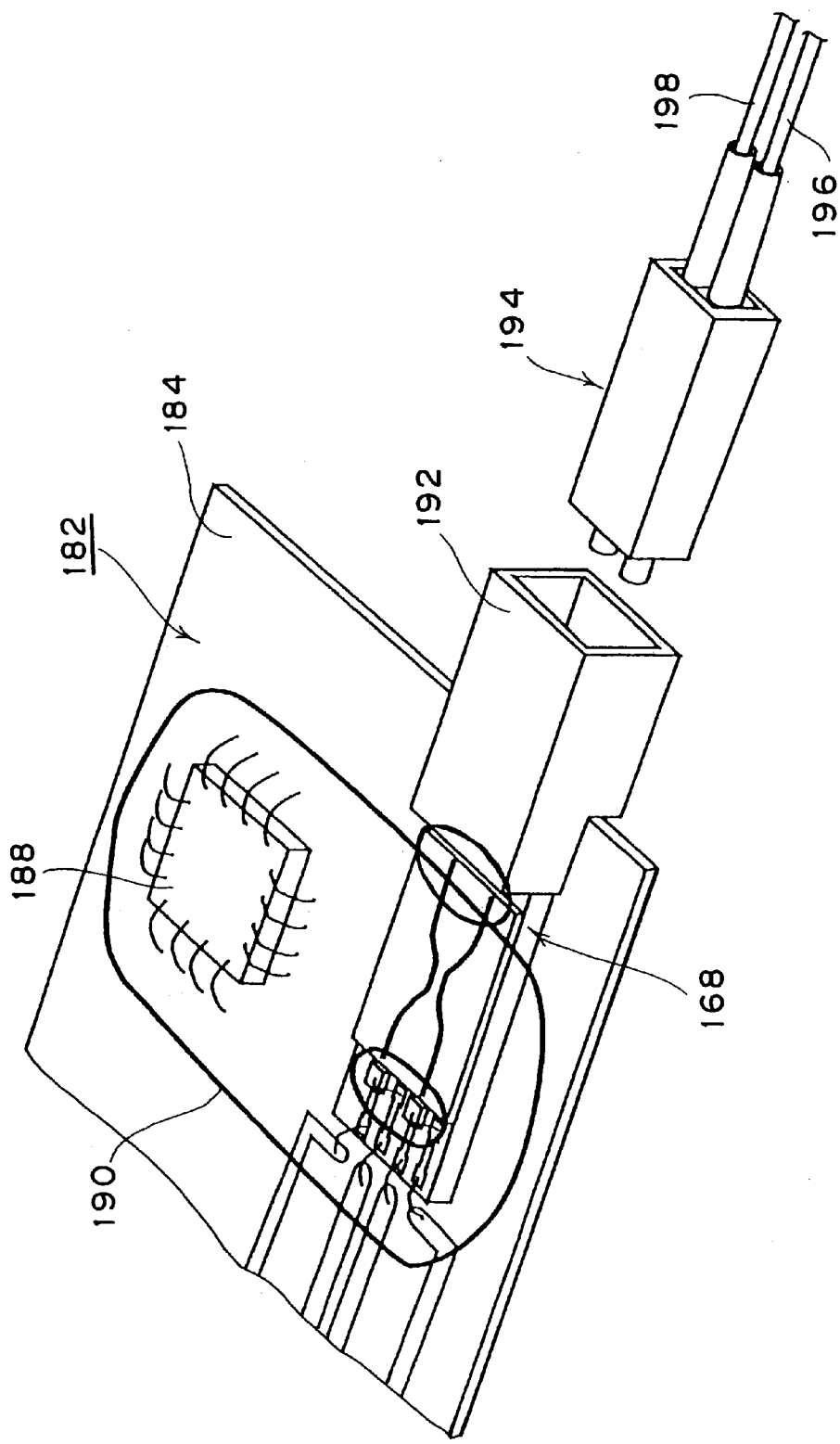
FIG. 25 is a perspective view of the optical transmission terminal device shown in FIG. 24 in its assembled condition.

Referring to FIGS. 24 and 25, there is shown an optical transmission terminal device 182 according to the fifth preferred embodiment of the present invention. The optical transmission terminal device 182 includes the optical module 168 shown in FIG. 23. A pattern of PbSn solder paste is preliminarily printed by a screen printing process on a printed wiring board 184 at given device mounting positions. The optical module 168 and an LSI chip 188 are placed on the given solder pattern of the printed wiring board 184, and thereafter soldered by reflow soldering. Then, the feed electrodes 12 and 14 of the optical module 168 and electrode pads of the LSI chip 188 are connected through gold wires to wiring patterns 186 formed on the printed wiring board 184. Thereafter, the LSI chip 188 and electrically connected portions between the feed electrodes 12 and 14 and the wiring patterns 186 are sealed commonly by an epoxy resin 190.

Reference numeral 192 denotes an optical fiber connector housing having a structure such that two optical fiber connector housings 36 shown in FIG. 5 are laterally joined. The optical fiber connector housing 192 is fixed to the optical module 168 mounted on the printed wiring board 184 by an epoxy resin. Reference numeral 194 denotes an optical fiber connector having a structure similar to that of the optical fiber connector 38 shown in FIG. 5 such that two ferrules are laterally arranged. Two optical fibers 196 and 198 are inserted and fixed in the two ferrules of the optical fiber connector 194.

Figure 26:
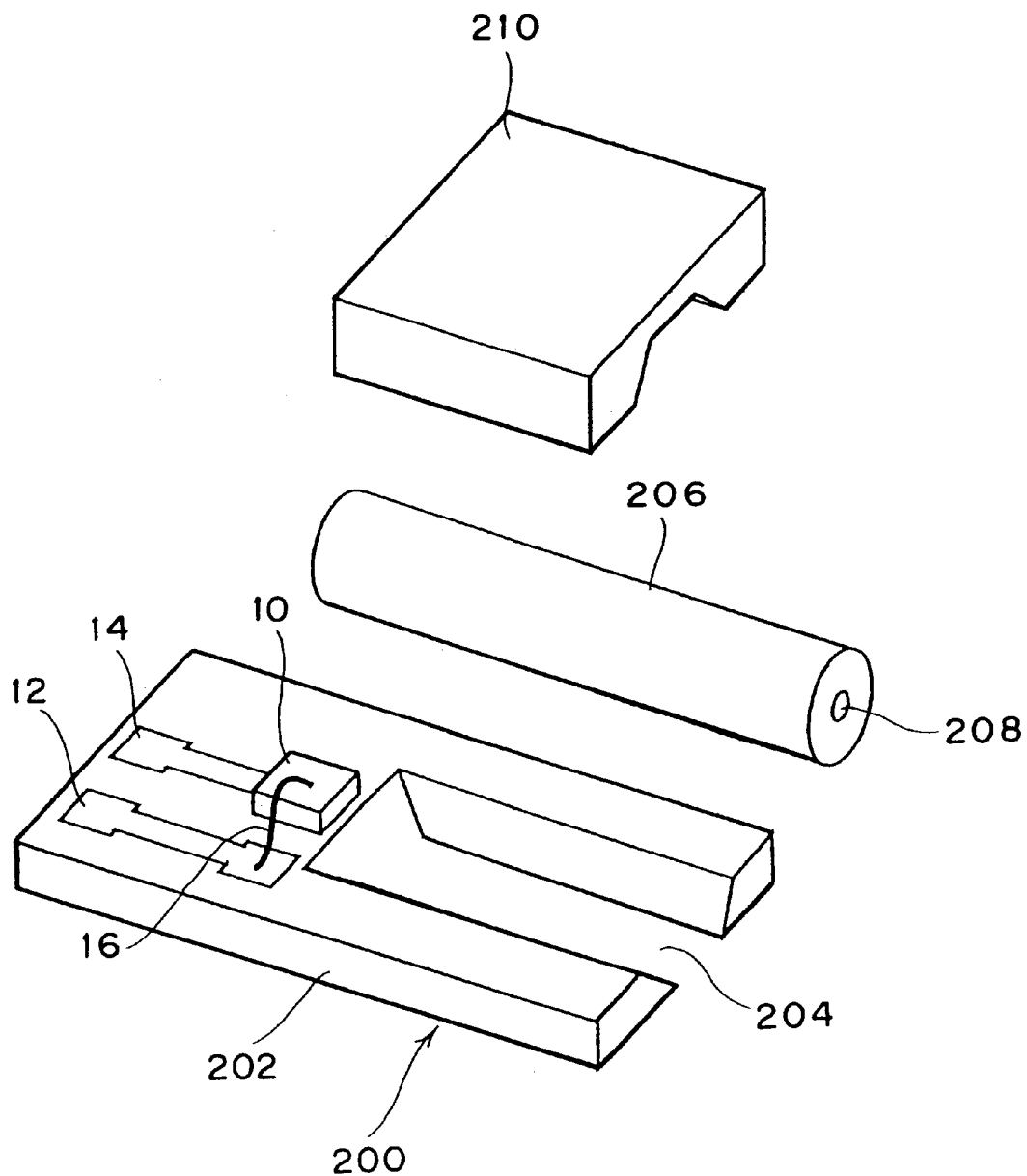
FIG. 26 is an exploded perspective view of an optical module applied to a sixth preferred embodiment of the optical transmission terminal device according to the present invention.
Figure 27:
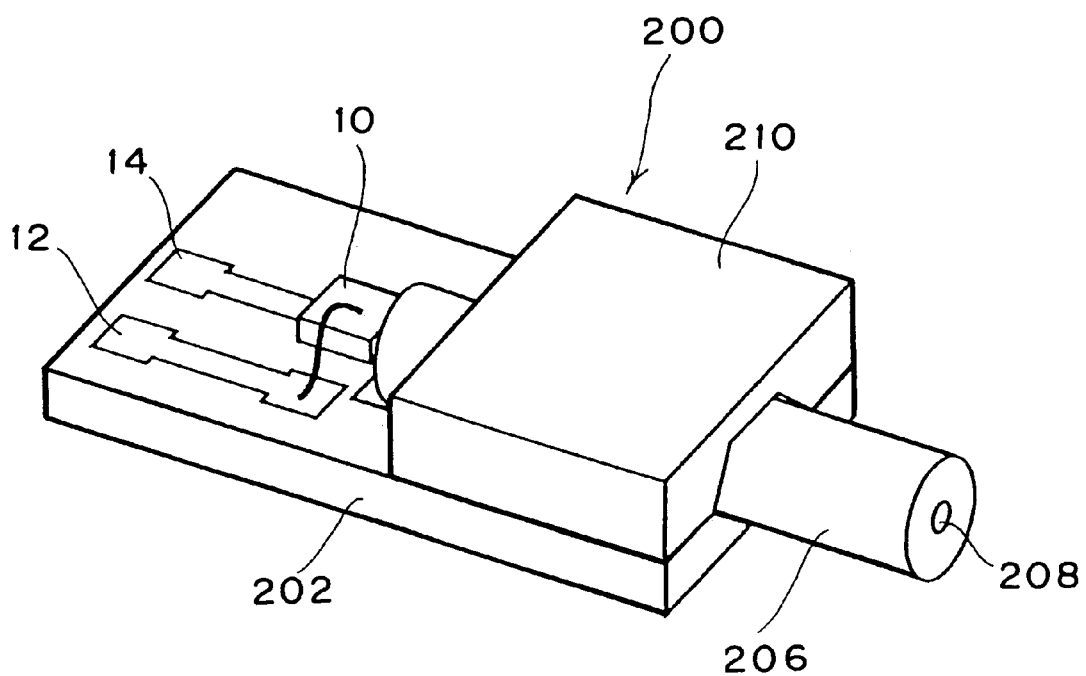
FIG. 27 is a perspective view of the optical module shown in FIG. 26 in its assembled condition.

Referring to FIGS. 26 and 27, there is shown an optical module 200 applied to a sixth preferred embodiment of the optical transmission terminal device according to the present invention. Reference numeral 202 denotes an optical component mounting substrate formed preferably of silicon. The silicon substrate may be replaced by a ceramic substrate, glass substrate, etc. An optical fiber 208 is fully inserted and fixed in a ferrule 206. The ferrule 206 with the optical fiber 208 may be fabricated by inserting the optical fiber 208 into a glass capillary and thereafter polishing both end faces of the glass capillary.

The optical component mounting substrate 202 has a slot 204 for holding the ferrule 206. The ferrule 206 is fixedly mounted in the slot 204 of the substrate 200, and a holder cover 210 is mounted on the substrate 202 so as to cover the ferrule 206 and soldered to the substrate 202. By optimally setting the width of the slot 204 and the diameter of the ferrule 206, optical coupling between the photoelectric converter 10 and the optical fiber 208 in the ferrule 206 is achieved. The optical module 200 is mounted on a printed wiring board (not shown) as in the optical transmission terminal device 24 shown in FIGS. 3 and 4.

In the case that the substrate 202 is formed of silicon, the slot 204 can be formed by a process shown in FIGS. 28A to 28G. A silicon substrate 212 having a thickness of 400 $\mu$m is selected to obtain a depth 350 $\mu$m of contact between the ferrule 206 and the slot 204. SiO$_2$ films 214 and 216 each having a thickness of about 2 $\mu$m are formed on the upper and lower surfaces of the silicon substrate 212 by thermal oxidation.

Figure 28A:
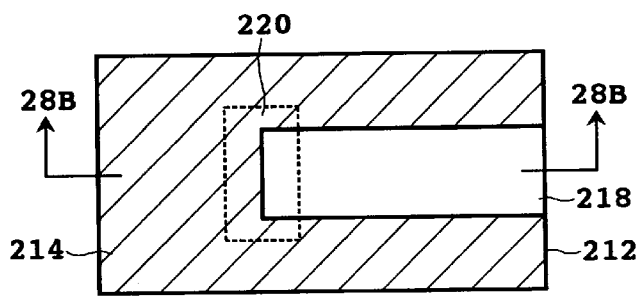
FIGS. 28A to 28G are views showing a forming process for a ferrule holding slot.
Figure 28B:
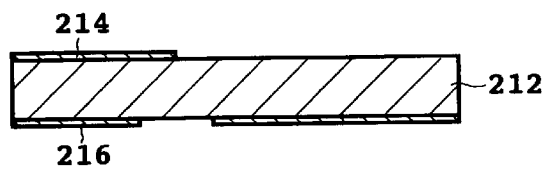
Figure 28C:
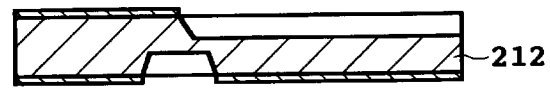
Figure 28D:
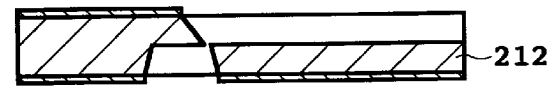

As shown in FIGS. 28A and 28B, a photoresist mask having a slot pattern 218 is formed on the upper surface of the silicon substrate 212 by photolithography. Then, a portion of the SiO$_2$ film 214 corresponding to the slot pattern 218 is removed by reactive ion etching using a CF$_4$ gas, and the photoresist mask is next removed by ashing. Similarly, a portion of the SiO$_2$ film 216 shown by a broken line 220 on the lower surface of the silicon substrate 212 is removed.

Figure 28E:
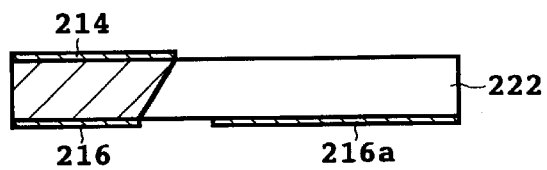
Figure 28F:
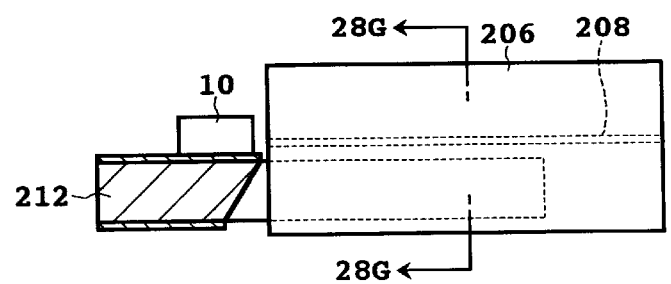
Figure 28G:
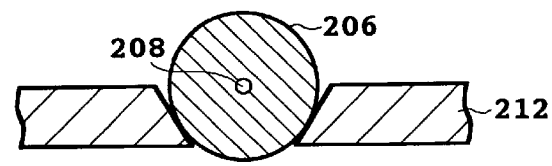

Then, the silicon substrate 212 is subjected to wet etching (anisotropic etching) using a 40% aqueous solution of KOH with the SiO$_2$ films 214 and 216 left on the silicon substrate 212 used as a mask (FIGS. 28C and 28D) to form a sectionally V-shaped slot 222 as shown in FIG. 28E. Then, the photoelectric converter 10 and the ferrule 206 having an outer diameter of 1.25 mm and enclosing the optical fiber 208 are mounted on the substrate 212 in such a manner that the ferrule 206 is positioned in the slot 222 in alignment with the photoelectric converter 10, thus achieving optical coupling between the photoelectric converter 10 and the optical fiber 208. A remaining portion 216a of the SiO$_2$ film 216 can be easily removed in mounting the ferrule 206, so that the portion 216a has no influence on the positioning of the ferrule 206. FIG. 28G is a cross section taken along the line 28G—28G in FIG. 28F.

Figure 29A:
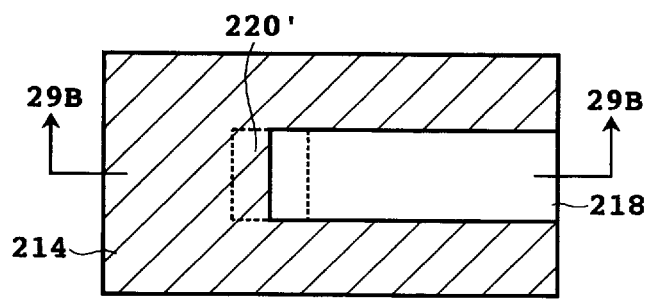
FIGS. 29A to 29G are views showing another forming process for the ferrule holding slot.
Figure 29B:
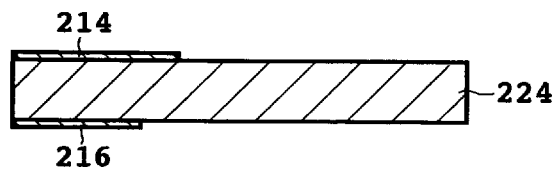

Referring to FIGS. 29A to 29G, there is shown another forming method for the ferrule holding slot by use of the silicon substrate. A silicon substrate 224 having a thickness of 800 $\mu$m is selected to obtain a depth 350 $\mu$m of contact between the ferrule 206 and the slot 204. SiO$_2$ films 214 and 216 each having a thickness of about 2 $\mu$m are formed on the upper and lower surfaces of the silicon substrate 224 by thermal oxidation. Then, slot patterns 218 and 220' are formed on the upper and lower surfaces of the silicon substrate 224 by using a photoresist mask, and portions of the SiO$_2$ films 214 and 216 corresponding to slot patterns 218 and 220' are removed by reactive ion etching. Thereafter, the photoresist mask is removed by ashing (FIGS. 29A and 29B).

Figure 29C:
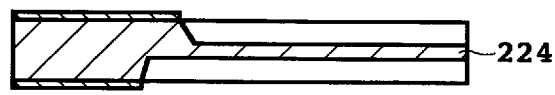
Figure 29D:
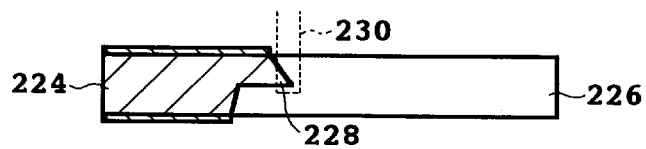
Figure 29E:
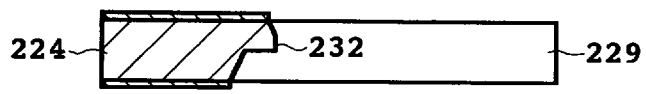
Figure 29F:
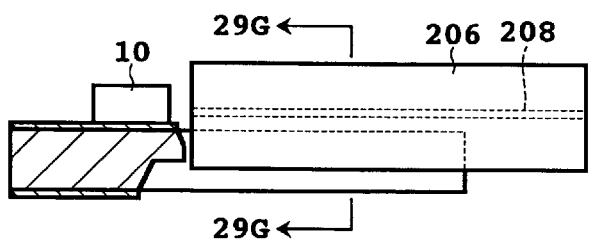
Figure 29G:
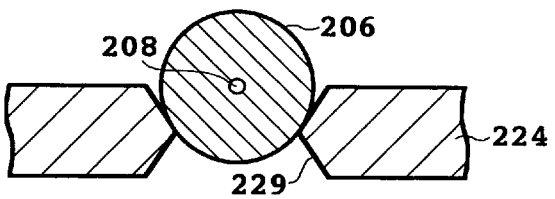

Then, the silicon substrate 224 is subjected to wet etching (anisotropic etching) using an aqueous solution of KOH to form a slot 226 as shown in FIGS. 29C and 29D. In the next step, a pointed portion 228 of the silicon substrate 225 is cut by using a dicing saw 230 to form a flat surface 232 to be opposed to a front end face of the ferrule 206 in parallel to each other, thus forming a final slot 229 for holding the ferrule 206. As shown in FIG. 29F, the photoelectric converter 10 and the ferrule 206 having an outer diameter of 1.25 mm and enclosing the optical fiber 208 are mounted on the substrate 224 in such a manner that the ferrule 206 is positioned in the slot 229 in alignment with the photoelectric converter 10, thus achieving optical coupling between the photoelectric converter 10 and the optical fiber 208. FIG. 29G is a cross section taken along the line 29G—29G in FIG. 29F.

Referring to FIGS. 30A to 30J, there is shown still another forming method for the ferrule holding slot by use of the silicon substrate. A silicon substrate 234 having a thickness of 1 mm is selected to obtain a depth 350 $\mu$m of contact between the ferrule 206 and the slot 204. SiO$_2$ films 214 and 216 each having a thickness of about 2.5 $\mu$m are formed on the upper and lower surfaces of the silicon substrate 234. First, a slot pattern 236 is formed on the lower surface of the silicon substrate 234 by using a photoresist mask, and a portion of the SiO$_2$ film 216 corresponding to the slot pattern 236 is removed as shown in FIGS. 30A and 30B. Then, the lower surface of the silicon substrate 234 is anisotropically etched to form a V-shaped (trapezoidal) groove 238 having a depth of about 200 $\mu$m.

As shown in FIGS. 30D and 30E, a V-shaped (trapezoidal) groove pattern 218 is formed on the upper surface of the silicon substrate 234 by using a photoresist mask, and a portion of the SiO$_2$ film 214 corresponding to the V-shaped groove pattern 218 is removed. Then, the V-shaped groove pattern 218 and the V-shaped groove 238 formed on the upper and lower surfaces of the silicon substrate 234 are simultaneously etched by anisotropic etching (FIG. 30F) to obtain a sectionally V-shaped slot 248 as shown in FIG. 30G. In the next step, a pointed portion 240 of the silicon substrate 234 is cut by using a dicing saw 230 to form a flat surface 242 to be opposed to a front end face of the ferrule 206 in parallel to each other, thus forming a final slot 249 for holding the ferrule 206 (FIG. 30H). As shown in FIG. 30I, the photoelectric converter 10 and the ferrule 206 having an outer diameter of 1.25 mm and enclosing the optical fiber 208 are mounted on the substrate 234 in such a manner that the ferrule 206 is positioned in the slot 249 in alignment with the photoelectric converter 10, thus achieving optical coupling between the photoelectric converter 10 and the optical fiber 208. FIG. 30J is a cross section taken along the line 30J—30J in FIG. 30I.

Figure 31A:
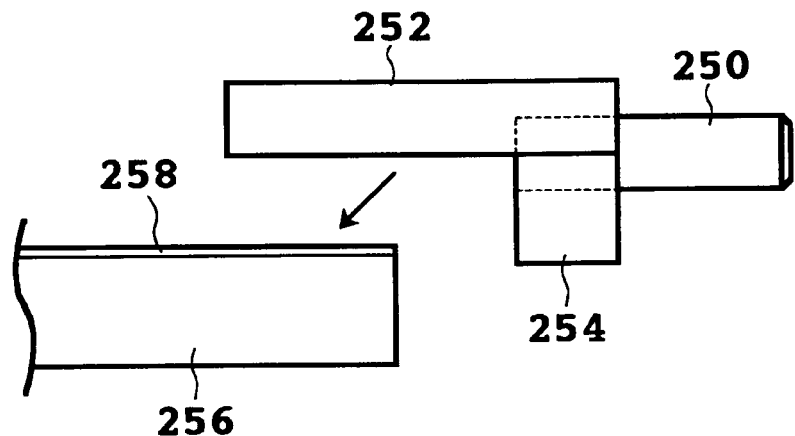
FIGS. 31A and 31B are side views showing a method of fixing a ferrule to an optical component mounting substrate.
Figure 31B:
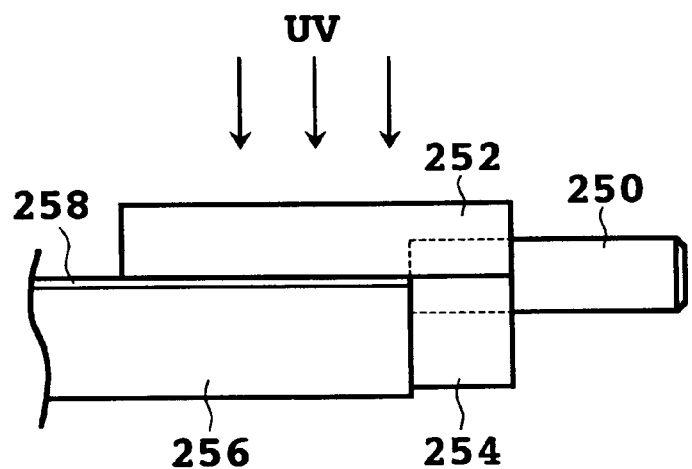

FIGS. 31A and 31B show another mounting method for a ferrule 250 enclosing an optical fiber. The ferrule 250 is held between two glass substrates 252 and 254 each formed with a ferrule holding groove. Reference numeral 256 denotes an optical component mounting substrate. An optical waveguide 258 is formed on the substrate 256 so as to be exposed to one end surface of the substrate 256. A photoelectric converter (not shown) is mounted on the substrate 256.

The ferrule 250 is located in such a manner that the upper holding substrate 252 comes into contact with the upper surface of the substrate 256, and is positioned with respect to the substrate 256, monitoring the optically coupled the state so that the optical fiber in the ferrule 250 is optically coupled to the optical waveguide 258 formed on the substrate 256. Finally, an ultraviolet curable adhesive preliminarily applied to a contact surface between the substrate 256 and the ferrule holding substrates 252 and 254 is exposed to ultraviolet radiation from the upper side, thereby fixing the ferrule holding substrates 252 and 254 to the substrate 256. The optical module manufactured by this process is mounted on a printed wiring board (not shown) as in the optical transmission terminal device 24 shown in FIGS. 3 and 4.

Figure 32:
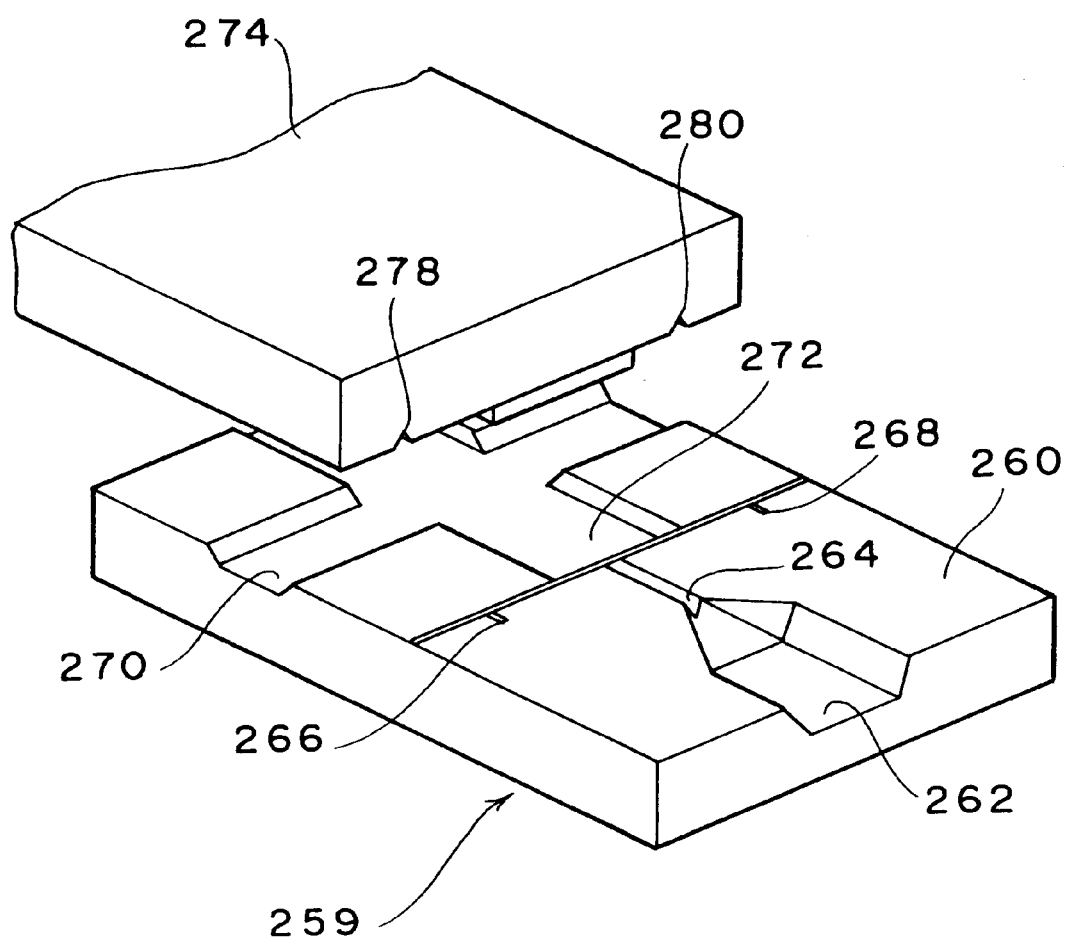
FIG. 32 is an exploded perspective view of an optical module according to another preferred embodiment of the present invention.
Figure 33:
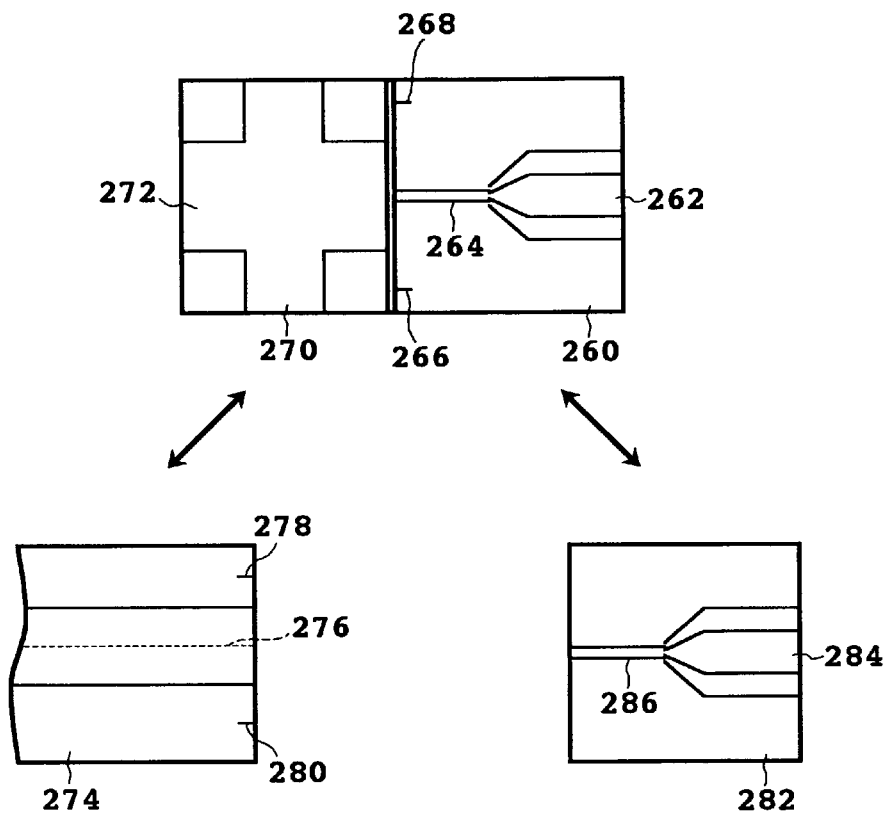
FIG. 33 is an exploded plan view of the optical module shown in FIG. 32.
Figure 34:
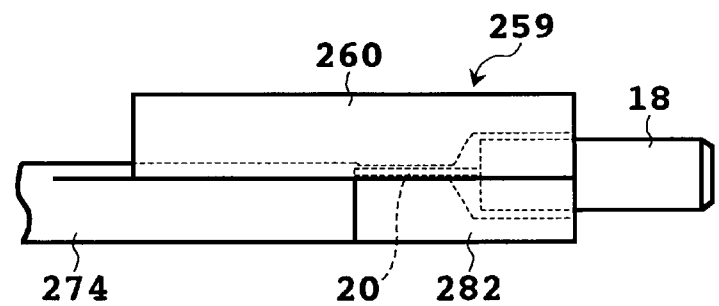
FIG. 34 is a side view of the optical module shown in FIG. 33.

FIGS. 32 to 34 show an optical module 259 according to another preferred embodiment of the present invention. The optical module 259 is composed generally of a silicon substrate 260, an optical component mounting substrate 274, and a holder substrate 282 for holding a ferrule 18 in which an optical fiber 20 is inserted and fixed. The silicon substrate 260 is formed with a groove 262 for receiving the ferrule 18, a groove 264 for receiving the optical fiber 20, markers 266 and 268, a groove 270 for receiving an adhesive, and a groove 272 for receiving a projection on the substrate 274. These grooves and markers are formed by anisotropic etching. The optical component mounting substrate 274 is formed of silicon. An optical waveguide 276 and markers 278 and 280 formed by anisotropic etching are formed on one surface of the substrate 274.

As shown in FIG. 32, the substrate 274 is placed on the ferrule holding substrate 260 in such a manner that the surface of the substrate 274 on which the optical waveguide 276 is formed, and the substrate 274 is positioned with respect to the substrate 260 so that the markers 278 and 280 are aligned with the markers 266 and 268, respectively. Thereafter, the substrate 274 is fixed to the substrate 260 by an adhesive preliminarily applied to the surface of the groove 270. As shown in FIG. 33, the holder cover 282 is also formed with a groove 284 for receiving the ferrule 18 and a groove 286 for receiving the optical fiber 20. The ferrule 18 and the optical fiber 20 are received in the grooves 262 and 264 of the ferrule holding substrate 260, respectively, and the holder cover 282 is fixedly mounted on the ferrule holding substrate 260 by an adhesive in such a manner that the ferrule 18 and the optical fiber 20 are received into the grooves 284 and 286, respectively. Although not shown, a photoelectric converter optically coupled to the optical waveguide 276 is mounted on the optical component mounting substrate 274.

According to the present invention, it is possible to provide an optical transmission terminal device having a package structure suitable for mass production and achieving low cost and high reliability.

What is claimed is:

1. An optical transmission terminal device comprising:

a printed wiring board;

an optical module mounted on said printed wiring board, said optical module having an optical component mounting substrate, a photoelectric converter mounted on said substrate, a first optical fiber having one end optically coupled to said photoelectric converter, a ferrule mounted on said substrate so as to partially project from said substrate, the other end portion of said first optical fiber being inserted and fixed in said ferrule, and feed electrodes formed on said substrate and connected to said photoelectric converter;

means for connecting said printed wiring board and said feed electrodes;

a transparent resin for commonly covering said connecting means and an optically coupled portion between said photoelectric converter and said first optical fiber; and an optical fiber connector housing mounted on said optical module so as to surround said ferrule, for allowing connection of said first optical fiber to a second optical fiber.

2. An optical transmission terminal device according to claim 1, wherein:

said substrate has a first groove for receiving said ferrule and a second groove for receiving said first optical fiber, said first and second grooves being continuous to each other; and said optical module further has a cover fixed to said substrate for holding said ferrule received in said first groove and said first optical fiber received in said second groove.

3. An optical transmission terminal device comprising:

a printed wiring board;

an optical module mounted on said printed wiring board, said optical module having an optical component mounting substrate, a photoelectric converter mounted on said substrate, a first optical fiber having one end optically coupled to said photoelectric converter, a ferrule mounted on said substrate so as to partially project from said substrate, the other end portion of said first optical fiber being inserted and fixed in said ferrule, and feed electrodes formed on said substrate and connected to said photoelectric converter;

means for connecting said printed wiring board and said feed electrodes;

a first resin having transparency for covering an optically coupled portion between said photoelectric converter and said first optical fiber;

a second resin for covering at least said connecting means; and an optical fiber connector housing mounted on said optical module so as to surround said ferrule, for allowing connection of said first optical fiber to a second optical fiber.

4. An optical transmission terminal device according to claim 3, wherein:

said substrate has a first groove for receiving said ferrule and a second groove for receiving said first optical fiber, said first and second grooves being continuous to each other; and said optical module further has a cover fixed to said substrate for holding said ferrule received in said first groove and said first optical fiber received in said second groove.

5. An optical transmission terminal device comprising:

a printed wiring board;

an optical module mounted on said printed wiring board, said optical module having an optical component mounting substrate, a photoelectric converter mounted on said substrate, a first optical fiber having one end optically coupled to said photoelectric converter, a ferrule mounted on said substrate so as to partially project from said substrate, the other end portion of said first optical fiber being inserted and fixed in said ferrule, feed electrodes formed on said substrate and connected to said photoelectric converter, and a cover fixed to said substrate for hermetically sealing said photoelectric converter and said first optical fiber;

means for connecting said printed wiring board and said feed electrodes;

an optical fiber connector housing fixed to said printed wiring board so as to surround said optical module, for allowing connection of said first optical fiber to a second optical fiber, said optical fiber connector housing having an opening at a portion corresponding to said connecting means; and a resin for filling said opening so as to cover said connecting means.

6. An optical transmission terminal device according to claim 5, wherein said optical fiber connector housing has a plurality of projections, and said printed wiring board has a plurality of holes, said projections being inserted into said holes, said optical fiber connector housing being fixed to said printed wiring board by said resin molded in said opening.

7. An optical transmission terminal device comprising:

a casing having an end wall formed with an opening and having an open top;

an optical module fixed in said casing, said optical module having an optical component mounting substrate, a photoelectric converter mounted on said substrate, a first optical fiber having one end optically coupled to said photoelectric converter, a ferrule mounted on said substrate so as to partially project from said opening of said casing, the other end portion of said first optical fiber being inserted and fixed in said ferrule, and feed electrodes formed on said substrate and connected to said photoelectric converter;

a transparent resin for filling said casing; and an optical fiber connector housing mounted on said casing so as to close said opening, for allowing connection of said first optical fiber to a second optical fiber.

8. An optical transmission terminal device according to claim 7, wherein said optical fiber connector housing comprises a body and a pair of connector holding members pivotably mounted to said body, said connector holding members being engageable with an optical fiber connector connected to said second optical fiber.

9. An optical transmission terminal device according to claim 7, wherein said casing further has a plurality of lead terminals, said optical transmission terminal device further comprising a printed wiring board in which said lead terminals are inserted and fixed.

10. An optical transmission terminal device comprising:

a casing having an end wall formed with an opening and having an open top;

an optical module fixed in said casing, said optical module having an optical component mounting substrate, a photoelectric converter mounted on said substrate, a first optical fiber having one end optically coupled to said photoelectric converter, a ferrule mounted on said substrate so as to partially project from said opening of said casing, the other end portion of said first optical fiber being inserted and fixed in said ferrule, feed electrodes formed on said substrate and connected to said photoelectric converter, and a cover fixed to said substrate so as to seal said photoelectric converter and said first optical fiber;

an optical fiber connector housing mounted on said casing so as to close said opening, for allowing connection of said first optical fiber to a second optical fiber; and a resin for filling said casing.

11. An optical transmission terminal device according to claim 10, wherein said optical fiber connector housing comprises a body and a pair of connector holding members pivotably mounted to said body, said connector holding members being engageable with an optical fiber connector connected to said second optical fiber.

12. An optical transmission terminal device according to claim 10, wherein said casing further has a plurality of lead terminals, said optical transmission terminal device further comprising a printed wiring board in which said lead terminals are inserted and fixed.

13. An optical transmission terminal device according to claim 10, further comprising a radiation fin mounted on said casing.

14. An optical transmission terminal device comprising:

a printed wiring board;

an optical module mounted on said printed wiring board, said optical module having an optical component mounting substrate having an optical waveguide, a photoelectric converter mounted on said substrate so as to be optically coupled to one end of said optical waveguide, a first optical fiber having one end optically coupled to the other end of said optical waveguide, a ferrule mounted on said substrate so as to partially project from said substrate, the other end portion of said first optical fiber being inserted and fixed in said ferrule, and feed electrodes formed on said substrate and connected to said photoelectric converter;

means for connecting said printed wiring board and said feed electrodes;

a transparent resin for covering an optically coupled portion between said photoelectric converter and said optical waveguide and an optically coupled portion between said optical waveguide and said first optical fiber; and an optical fiber connector housing mounted on said optical module so as to surround said ferrule, for allowing connection of said first optical fiber to a second optical fiber.

15. An optical transmission terminal device according to claim 14, further comprising an electrical component mounted on said printed wiring board, and a resin for commonly covering said connecting means and said electrical component.

16. An optical transmission terminal device comprising:

a printed wiring board;

an optical module mounted on said printed wiring board, said optical module having a silicon substrate having a slot, a photoelectric converter mounted on said substrate, a ferrule held within said slot so as to extend substantially parallel to said substrate, said ferrule having one end portion projecting from said substrate, a first optical fiber inserted and fixed in said ferrule and having one end optically coupled to said photoelectric converter, feed electrodes formed on said substrate and connected to said photoelectric converter, and a cover fixed to said substrate for holding said ferrule;

means for connecting said printed wiring board and said feed electrodes;

a transparent resin for covering at least an optically coupled portion between said photoelectric converter and said first optical fiber; and an optical fiber connector housing mounted on said optical module so as to surround said ferrule, for allowing connection of said first optical fiber to a second optical fiber.

17. An optical transmission terminal device according to claim 16, wherein:

said substrate has a thickness slightly larger than a depth of contact between said ferrule and said slot; and said slot comprises upper and lower joined grooves simultaneously formed by anisotropically etching upper and lower surfaces of a silicon substrate, said slot having a slant end surface opposed to the other end of said ferrule, said slant end surface being gradually deviated from the other end of said ferrule from said upper surface toward said lower surface.

18. An optical transmission terminal device according to claim 16, wherein:

said substrate has a thickness slightly larger than twice a depth of contact between said ferrule and said slot; and said slot comprises upper and lower joined grooves simultaneously formed by anisotropically etching upper and lower surfaces of a silicon substrate, said slot having a flat end surface opposed to the other end of said ferrule in parallel to each other, said flat end surface being formed by cutting.

19. An optical transmission terminal device according to claim 16, wherein:

said substrate has a thickness sufficiently larger than twice a depth of contact between said ferrule and said slot; and said slot comprises upper and lower joined grooves formed by an anisotropic etching process comprising a first step of anisotropically etching a lower surface of a silicon substrate and a second step of simultaneously anisotropically etching upper and lower surfaces of said silicon substrate, said slot having a flat end surface opposed to the other end of said ferrule in parallel to each other, said flat end surface being formed by cutting.

20. An optical transmission terminal device comprising:

a printed wiring board;

an optical module mounted on said printed wiring board, said optical module having an optical component mounting substrate having an optical waveguide, a photoelectric converter mounted on said substrate so as to be optically coupled to said optical waveguide, a ferrule, a first optical fiber inserted and fixed in said ferrule, a first holding member for holding one end portion of said ferrule, a second holding member for sandwiching said one end portion of said ferrule in cooperation with said first holding member, means for fixing said first and second holding members so that said first optical fiber is optically coupled to said optical waveguide, and feed electrodes formed on said substrate and connected to said photoelectric converter;

means for connecting said printed wiring board and said feed electrode; and a transparent resin for covering an optically coupled portion between said photoelectric converter and said optical waveguide and an optically coupled portion between said first optical fiber and said optical waveguide.

21. An optical module comprising:

an optical component mounting substrate having an optical waveguide and a first marker;

a photoelectric converter mounted on said optical component mounting substrate so as to be optically coupled to one end of said optical waveguide;

a first holding substrate having a first groove, an adhesive retention groove, and a second marker;

a second holding substrate having a second groove;

a ferrule partially received in said first and second grooves; and an optical fiber inserted and fixed in said ferrule;

said optical component mounting substrate, said first holding substrate, and said second holding substrate being fixed together by an adhesive so that said optical fiber is optically coupled to the other end of said optical waveguide.

22. An optical module according to claim 21, wherein said first marker and said second marker are aligned with each other to position said optical component mounting substrate with respect to said first holding substrate.

* * * * *